(12) United States Patent
Zhang et al.

(10) Patent No.: US 11,503,333 B2
(45) Date of Patent: Nov. 15, 2022

(54) UNIFIED MERGE CANDIDATE LIST USAGE

(71) Applicant: Qualcomm Incorporated, San Diego, CA (US)

(72) Inventors: Kai Zhang, San Diego, CA (US); Jianle Chen, San Diego, CA (US); Li Zhang, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 153 days.

(21) Appl. No.: 16/762,777

(22) PCT Filed: Nov. 14, 2018

(86) PCT No.: PCT/US2018/060912
§ 371 (c)(1),
(2) Date: May 8, 2020

(87) PCT Pub. No.: WO2019/099444
PCT Pub. Date: May 23, 2019

(65) Prior Publication Data
US 2021/0195234 A1 Jun. 24, 2021

Related U.S. Application Data

(63) Continuation of application No. 16/188,774, filed on Nov. 13, 2018, now abandoned.
(Continued)

(51) Int. Cl.
*H04N 19/56* (2014.01)
*H04N 19/176* (2014.01)
(Continued)

(52) U.S. Cl.
CPC ........... *H04N 19/56* (2014.11); *H04N 19/176* (2014.11); *H04N 19/52* (2014.11); *H04N 19/70* (2014.11)

(58) Field of Classification Search
None
See application file for complete search history.

(56) References Cited

U.S. PATENT DOCUMENTS

| 10,560,712 | B2 | 2/2020 | Zou et al. | |
| 2019/0028731 | A1* | 1/2019 | Chuang | H04N 19/109 |
| 2019/0058896 | A1* | 2/2019 | Huang | H04N 19/105 |

FOREIGN PATENT DOCUMENTS

| WO | 2017118409 A1 | 7/2017 |
| WO | 2017118411 A1 | 7/2017 |
| WO | 2017148345 A1 | 9/2017 |

OTHER PUBLICATIONS

Chen H., et al., "Affine Skip and Merge Modes for Video Coding", IEEE 17th International Workshop on Multimedia Signal Processing (MMSP), Oct. 19-21, 2015, 5 Pages.
(Continued)

*Primary Examiner* — Lindsay J Uhl
(74) *Attorney, Agent, or Firm* — Shumaker & Sieffert, P.A.

(57) ABSTRACT

A video decoder including one or more processors configured to receive one or more bits, in a bitstream, that indicate the encoded current block of video data was encoded based on a unified candidate list that includes motion vector candidates based on one or more translational motion vectors, and motion vector candidates based on one or more affine motion vectors. A merge index represented in the bitstream may indicate which candidate in the unified candidate list is associated with the motionvector of the encoded current block of video data. Based on the merge index, the one or more processors are configured to select one or more motion vectors of a candidate from the unified candidate list, based on the merge index, where the candidate has one or more of the motion vectors corresponding to the translational motion vectors or affine motion vectors within the unified candidate list.

16 Claims, 12 Drawing Sheets

Related U.S. Application Data

(60) Provisional application No. 62/586,117, filed on Nov. 14, 2017.

(51) Int. Cl.
*H04N 19/52* (2014.01)
*H04N 19/70* (2014.01)

(56) References Cited

OTHER PUBLICATIONS

Chen J., et al., "Algorithm Description of Joint Exploration Test Model 7 (JEM7)", 7 JVET Meeting, Jul. 13, 2017-Jul. 21, 2017, JVET-G1001-V1, Joint Video Exploration Team (JVET) of ITU-T SG 16 WP3 and ISO/IEC JTC 1/SC 29/WG 11, No. G1001_v1, JVET-G1001, 7th Meeting, Jul. 13, 2017-Jul. 21, 2017, Torino, IT, Aug. 19, 2017 (Aug. 19, 2017), XP030150980, 48 Pages, pp. i-iv, Retrieved from the Internet: URL: https://phenix.int-evry.fr/jvet/doc_end_user/documents/7_Torino/wg11/JVET-G1001-v1.zip JVET-G1001-v1.docx, [retrieved on Aug. 19, 2017].

Chen Y., et al., "Description of SDR, HDR and 360° Video Coding Technology Proposal by Qualcomm and Technicolor-Low and High Complexity Versions", 10th JVET Meeting, San Diego, US, Apr. 10-20, 2018 (Apr. 10, 2018-Apr. 20, 2018), The Joint Video Exploration Team (JVET) of ISO/IEC JTC 1/SC 29/WG 11 and ITU-T SG 16 WP 3), URL: http://phenix.int-evry.fr/jvet, No. JVET-J0021-V5, Apr. 14, 2018 (Apr. 14, 2018), XP030151184, pp. 1-43.

Hsu C-W., et al., "Description of SDR Video Coding Technology Proposal by MediaTek",10th JVET Meeting, Apr. 10, 2018-Apr. 20, 2018, San Diego, (The Joint Video Exploration Team of ISO/IEC JTC1/SC 29/WG11 and ITU-TSG.16 WP 3), URL: http://phenix.int-evry.fr/jvet/, No. JVET-J0018, Apr. 3, 2018 (Apr. 3, 2018), XP030151179, 64 Pages.

International Preliminary Report on Patentability—PCT/US2018/060912 The International Bureau of WIPO—Geneva, Switzerland, May 28, 2020, 9 pp.

International Search Report and Written Opinion—PCT/US2018/060912—ISA/EPO—dated Mar. 11, 2019, 16 pp.

Zhang K., et al., "An Improved Framework of Affine Motion Compensation in Video Coding", IEEE Transactions on Image Processing (Early Access), Oct. 22, 2018, pp. 1-13.

Wang Y., et al., "High Efficiency Video Coding (HEVC) Defect Report 2", Joint Collaborative Team on Video Coding ((JCT-VC), 15th Meeting: CH, Oct. 23-Nov. 1, 2013, Document: JCTVC-O1003_v2, 311 pages.

Flynn D., et al., "High Efficiency Video Coding (HEVC) Range Extensions text specification: Draft 6," (Joint 31 Collaborative Team on Video Coding of ITU-T SG.16 WP 3 and ISO/IEC JTC1/SC29/WG11), 16th Meeting: San Jose, US, Jan. 9-17, 2014, Document: JCTVC-P1005_v1, 368 pages.

ITU-T H.265, Series H: Audiovisual and Multimedia Systems, Infiastructure of Audiovisual Services—Coding of Moving Video, High Efficiency Video Coding, The International Telecommunication Union, Feb. 2018, 692 Pages.

Taiwan Search Report—TW107140443—TIPO—dated Apr. 28, 2022, 1 pp.

\* cited by examiner

UNIFIED MERGE CANDIDATE LIST USAGE

CLAIM OF PRIORITY

This Application claims the benefit of U.S. patent application Ser. No. 16/188,774 filed on Nov. 13, 2018 and U.S. Provisional Application No. 62/586,117 filed on Nov. 14, 2017, the entire contents of which are hereby incorporated by reference.

TECHNICAL FIELD

This application relates to devices, systems, and methods for video coding.

BACKGROUND

Digital video capabilities may be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as tree blocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

This disclosure relates to a device for video decoding an encoded current block of video data. The device for video decoding may include a memory configure to store a reconstructed current block of video data. The device may also include one or more processors configured receive a one or more bits, in a bitstream, that represent a flag, and indicate the encoded current block of video data was encoded based on a unified candidate list that includes motion vector candidates based on one or more translational motion vectors, and motion vector candidates based on one or more affine motion vectors. In addition, the one or more processors may be configured to receive a merge index that indicates which candidate in the unified candidate list. Moreover, the one or more processors may be configured to select one or more motion vectors of a candidate from the unified candidate list, based on the merge index, where the candidate has one or more of the motion vectors corresponding to the translational motion vectors or affine motion vectors within the unified candidate list. The one or more processors may also be configured to determine, based on the selected one or more motion vectors from the candidate list, a predictor block of video data, and reconstruct the current block of video data based on the predictor block of video data.

The techniques are also directed to a method of decoding an encoded current block of video data, comprising receiving one or more bits, in a bitstream, that represent a flag, and indicate the encoded current block of video data was encoded based on a unified candidate list that includes motion vector candidates based on one or more translational motion vectors, and motion vector candidates based on one or more affine motion vectors. In addition, the method includes receiving a merge index that indicates which candidate in the unified candidate list. Moreover, the method may include selecting one or more motion vectors of a candidate from the unified candidate list, based on the merge index, where the candidate has one or more of the motion vectors corresponding to the translational motion vectors or affine motion vectors within the unified candidate list. In addition, the method may include determining, based on the selected one or more motion vectors from the candidate list, a predictor block of video data. After the determining of the predictor bock of video data, the method may include reconstructing the current block of video data based on the predictor block of the video data.

This disclosure also includes an apparatus for video decoding an encoded current block of video data, the apparatus includes means for receiving one or more bits, in a bitstream, that represent a flag, and indicate the encoded current block of video data was encoded based on a unified candidate list that includes motion vector candidates based on one or more translational motion vectors, and motion vector candidates based on one or more affine motion vectors. In addition, the apparatus also includes means for receiving a merge index, that indicates which candidate in the unified candidate list is associated with the motion vector of the encoded current block of video data. Moreover, the apparatus may include means for selecting one or more motion vectors of a candidate from the unified candidate list, based on the merge index, where the candidate has one or more of the motion vectors corresponding to the translational motion vectors or affine motion vectors within the unified candidate list. In addition, the apparatus may include means for determining, based on the selected one or more motion vectors from the candidate list, a predictor block of video data. The apparatus may also include means for reconstructing the current block of video data based on the predictor block of the video data.

This disclosure relates to a device for video decoding an encoded current block of video data. The device for video decoding may include a memory configure to store a reconstructed current block of video data. The device may also include one or more processors configured receive a one or more bits, in a bitstream, that represent a flag, and indicate the encoded current block of video data was encoded based on a unified candidate list that includes motion vector candidates based on one or more translational motion vectors, and motion vector candidates based on one or more affine motion vectors. In addition, the one or more processors may be configured to receive a merge index that indicates which candidate in the unified candidate list. Moreover, the one or more processors may be configured to select one or more motion vectors of a candidate from the unified candidate list, based on the merge index, where the candidate has one or more of the motion vectors corresponding to the translational motion vectors or affine motion vectors within the unified candidate list. The one or more processors may also be configured to determine, based on the selected one or more motion vectors from the candidate list, a predictor block of video data, and reconstruct the current block of video data based on the predictor block of video data.

This disclosure also relates to a computer readable medium having stored thereon instructions that when executed by one or more processors receive one or more bits, in a bitstream, that represent a flag, and indicate an encoded current block of video data was encoded based on a unified candidate list that includes motion vector candidates based on one or more translational motion vectors, and motion vector candidates based on one or more affine motion vectors. In addition, the instructions when executed by one or more processors may be configured to receive a merge index that indicates which candidate in the unified candidate list. Moreover, the instructions when executed by one or more processors may be configured to select one or more motion vectors of a candidate from the unified candidate list, based on the merge index, where the candidate has one or more of the motion vectors corresponding to the translational motion vectors or affine motion vectors within the unified candidate list. The instructions when executed by one or more processors may also be configured to determine, based on the selected one or more motion vectors from the candidate list, a predictor block of video data, and reconstruct the current block of video data based on the predictor block of video data.

This disclosure also relates to a device for video encoding. The device for video encoding may include one or more processors configured to select one or more motion vectors corresponding to translational motion of a normal merge candidate. In addition, the one or more processors may be configured to select one or more motion vectors corresponding to affine motion of an affine merge candidate. The one or more processors may be configured to construct a unified candidate list comprising more than one normal merge candidate, and more than one affine merge candidate.

Moreover, the one or more processors may be configured to assign a merge index to each of the more than one normal merge candidate and each of the more than one affine merge candidate in the unified candidate list, based on a prioritization order of the more than one affine merge candidate and the more than one normal merge candidate. In addition, the one or more processors may be configured to select a merge index from the index of the unified candidate list, based on a cost associated with the normal merge candidate, or the affine merge candidate in the unified candidate list, and provide the merge index in a bitstream.

The details of one or more examples of this disclosure are set forth in the accompanying drawings and the description below. Other features, objects, and advantages of various aspects of the techniques will be apparent from the description and drawings, and from the claims.

DETAILED DESCRIPTION

Figure 1A:
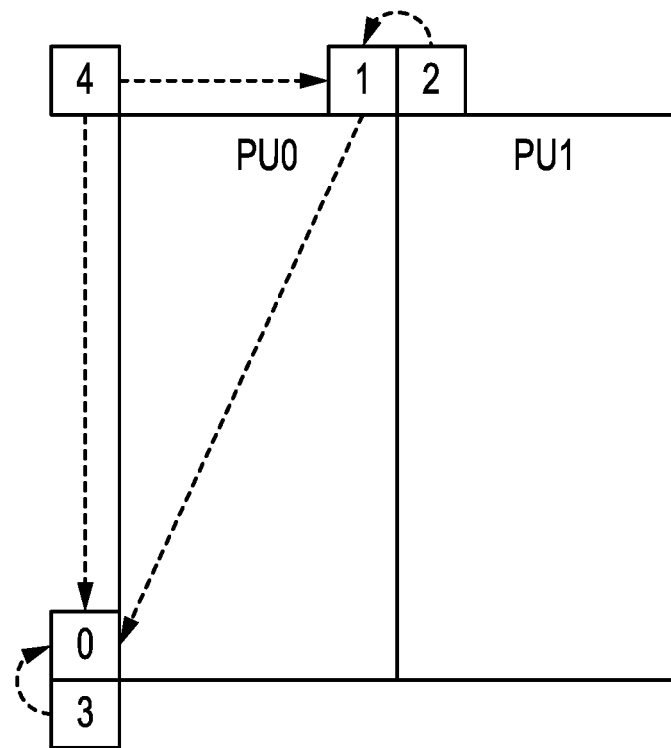
FIG. 1 illustrates spatial neighboring normal mere candidates (A) in merge mode and (B) in AMVP mode.

Affine Motion Compensation was introduced as a coding tool in the Joint Exploration Model (JEM) developed by the Joint Video Exploration Team, following the development of HEVC. In JEM, both four-parameter and six-parameter affine motion models were introduced. These affine motion models often offer improvements on coding gains for motion due to non-translational movement, e.g., zooming and rotation. However, the current use of these models is based on causal dependence of entering into at least two separate merge modes. That is to say, a video encoder and/or decoder would have to operate int at least two different merge modes: (1) a merge mode; and (2) an affine-merge mode. In addition, at least two separate candidate lists had to be maintained by the decoder and/or encoder: (1) the merge candidate list; and (2) the affine merge candidate list. One problem with two merge modes is that a video encoder may have to code the current block in a merge mode and send a merge flag to the video decoder. Subsequently, the video encoder would check if the neighboring blocks (e.g., A0, B0, B1, A1 and A2) of the current bock were coded with an affine inter-mode or affine merge-mode. If at least one of these neighboring blocks met this condition, the encoder signals an affine flag to the decoder, and the decoder then use candidates for motion vectors from the affine merge candidate list. As an alternate solution, in JEM2.0 reference software, for affine merge mode, only the affine flag is encoded and transmitted. The merge index is then inferred to be the first available neighboring affine model with a predefined checking order A-B-C-D-E (as discussed later).

To avoid using two different merge modes which requires having two different coding paths, i.e., a merge mode coding path and an affine merge mode coding path, a unified merge mode candidate list is proposed. Having a unified merge mode candidate list facilitates the decoder having to avoid detecting and parsing an extra flag, namely, the affine flag that was previously set. In addition, there is a more efficient solution as there is a reduction in complexity in having one unified candidate list, versus maintaining two separate lists: merge candidate list and an affine-merge candidate list. Moreover, the coding performance may be improved.

The sophistication level of video decoders has evolved such that a number of operations that may be performed in a video encoder may also be performed in a video decoder. For example, both an encoder and a decoder may determine what a unified candidate list is independent of the data for the current block. However, a video decoder may not always make the same determination as to which candidate, associated with the current block in the unified candidate list may be used, without receiving data from an encoder. This may occur because sometimes a previous frame's motion vector may be used with the encoding or decoding of the current video block.

The solution to the problem addressed above is for a video decoder to use one or more processors that are configured to receive a bitstream, including encoded video data, wherein the encoded video data includes an encoded current block of video data. The bitstream may be stored in a memory, and the "receive" may be considered a "retrieve" of a bitstream. For example, a video is compressed and stored in memory. The video decoder may retrieve the compressed video and decompressed it, i.e., decode the bitstream and reconstruct the compressed video. In addition, the one or more processors may be configured to receive a one or more bits, in the bitstream, that represent a flag, and indicate the encoded current block of video data was encoded based on a unified candidate list. The unified candidate list may include motion vector candidates based on one or more translational motion vectors, and motion vector candidates based on one or more affine motion vectors. Moreover, the one or more processors may be configured to receive a merge index, in response to the one or more bits that represent the flag. The merge index may indicate which candidate in the unified candidate list is associated with the motion vector of the encoded current block of video data. The one or more processors may also be configured to select one or more motion vectors of a candidate from the unified candidate list, based on the merge index, where the candidate has one or more of the motion vectors corresponding to the translational motion vectors or affine motion vectors within the unified candidate list. A predictor block of video data may be determined, by the one or more processors, or configured to be determined, based on the or more motion vectors selected from the candidate list. The one or more processors may then be configured to reconstruct a current block of video data based on the predictor block of video data.

Additional context of the solution will be described with reference to the figures, and in the detailed description below.

Motion Information

In H.265/HEVC, for each block, a set of motion information may be available. A set of motion information may contain motion information for forward and backward prediction directions. Forward and backward prediction directions are two prediction directions of a bi-directional prediction mode and the terms "forward" and "backward" do not necessarily have a geometrical meaning, instead they correspond to reference picture list 0 (RefPicList0) and reference picture list 1 (RefPicList1) of a current picture. When only one reference picture list is available for a picture or slice, only RefPicList0 may be available and the motion information of each block of a slice is forward.

For each prediction direction, the motion information may contain a reference index and a motion vector. In some cases, for simplicity, a motion vector itself may be referred to in a way that it is assumed that it has an associated reference index. A reference index may be used to identify a reference picture in the current reference picture list (RefPicList0 or RefPicList1). A motion vector has a horizontal and a vertical component.

POC

Picture order count (POC) is widely used in video coding standards to identify a display order of a picture. Although there are cases where two pictures within one coded video sequence may have the same POC value, it often does not happen within a coded video sequence. When multiple coded video sequences are present in a bitstream, pictures with a same value of POC may be closer to each other in terms of decoding order.

POC values of pictures are often used for reference picture list construction, and derivation of reference picture set, as in, HEVC and motion vector scaling.

CU Structure in HEVC

In HEVC, the largest coding unit in a slice is called a coding tree block (CTB). A CTB contains a quad-tree the nodes of which are coding units. The size of a CTB may be ranges from 16×16 to 64×64 in the HEVC main profile (although technically 8×8 CTB sizes may be supported). A coding unit (CU) could be the same size of a CTB although and as small as 8×8. Each coding unit is coded with one mode. When a CU is inter coded, it may be further partitioned into two prediction units (PUs) or become just one PU when further partition does not apply. When two PUs are present in one CU, they may be half size rectangles or two rectangle size with ¼ or ¾ size of the CU.

When the CU is inter coded, one set of motion information is present for each PU. In addition, each PU is coded with a unique inter-prediction mode to derive the set of motion information. In HEVC, the smallest PU sizes are 8×4 and 4×8.

Motion Prediction in HEVC

In the HEVC standard, there are two inter prediction modes, named merge (skip is considered as a special case of merge) and advanced motion vector prediction (AMVP) modes respectively for a prediction unit (PU).

In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to five ("5") candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, the predicted motion vectors may be further refined.

As may be seen above, a merge candidate corresponds to a full set of motion information while an AMVP candidate contains just one motion vector for a specific prediction direction and reference index.

The candidates for both modes are derived similarly from the same spatial and temporal neighboring blocks.

In JEM, now being referred to as Versatile Video Coding (VVC) as of April 2018, the MV candidate list may contain up to seven ("7") candidates for the merge mode.

Spatial Neighboring Candidates

Spatial MV candidates are derived from the neighboring blocks shown on FIG. 1, for a specific PU ($PU_0$), although the methods generating the candidates from the blocks differ for merge and AMVP modes.

In merge mode, up to four spatial MV candidates may be derived with the orders showed on FIG. 1A with numbers, and the order is the following: left (0), above (1), above right (2), below left (3), and above left (4), as shown in FIG. 1A. Pruning operations may be applied to remove identical MV candidates.

Figure 1B:
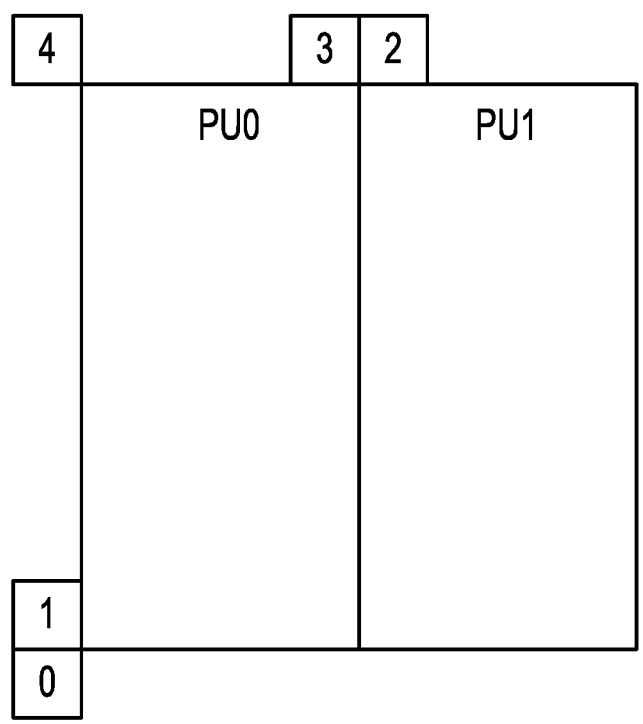

In AVMP mode, the neighboring blocks are divided into two groups: left group consisting of the block 0 and 1, and above group consisting of the blocks 2, 3, and 4 as shown on FIG. 1B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences may be compensated.

Motion Compensation in H.265/HEVC

Motion compensation in H.265/HEVC are used to generate a predictor for the current inter-coded block. Quarter pixel accuracy motion vector is used and pixel values at fractional positions are interpolated using neighboring integer pixel values for both luma and chroma components.

Affine Motion Prediction in JVET Activities

In the current existing video codec standards, prior to VVC, only a translational motion model is applied for motion compensation prediction (MCP). While in the real world, there exists many kinds of motions, e.g. zoom in/out, rotation, perspective motions and the other irregular motions. If we still only apply translation motion model for MCP in such test sequences with irregular motions, it will affect the prediction accuracy and result in low coding efficiency.

Figure 2:
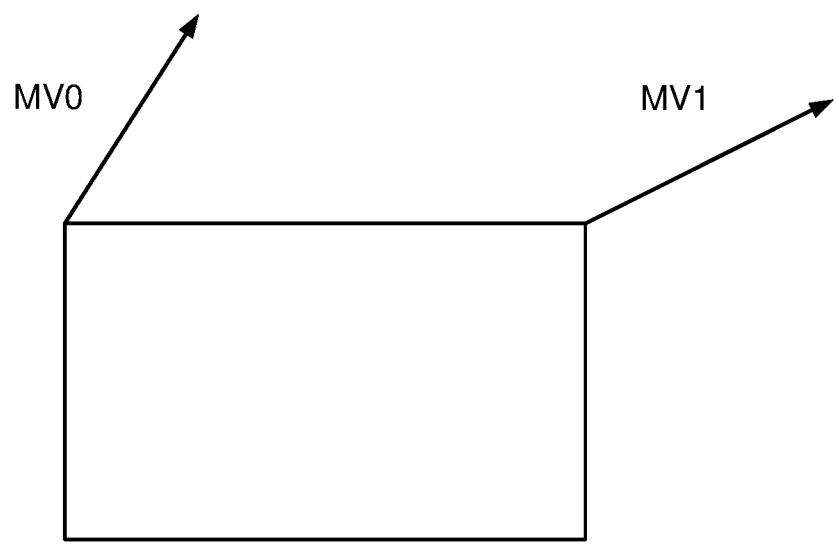
FIG. 2 illustrates two point MV affine with 4 affine parameters.

For many years, attempts have been made to design algorithms to improve MCP for higher coding efficiency. An affine merge and affine inter modes are proposed to deal with affine motion models with 4 parameters as $$\begin{cases} mv_x = ax - by + c \\ mv_y = bx + ay + d \end{cases} \quad (1)$$

where ($vx_0, vy_0$) is the control point motion vector on top left corner, and ($vx_1, vy_1$) is another control point motion vector on above right corner of the block as shown in FIG. 2. The affine mode may be represented as $$\begin{cases} mv_x = \frac{(mv_{1x} - mv_{0x})}{w} x - \frac{(mv_{1y} - mv_{0y})}{w} y + mv_{0x} \\ mv_y = \frac{(mv_{1y} - mv_{0y})}{w} x + \frac{(mv_{1x} - mv_{0x})}{w} y + mv_{0y} \end{cases} \quad (2)$$

where w is the width of the block. In the current JEM software, the affine motion prediction is only applied to square blocks. However, according to an example, the affine motion prediction may be applied to non-square blocks. Similar to the conventional translation motion coding, two modes (i.e., inter mode with motion information signaled and merge mode with motion information derived) may be supported for affine motion coding.

Affine Inter Mode

For every CU/PU whose size is equal to or larger than 16×16, AF_INTER mode may be applied as follows. If the current CU/PU is in AF_INTER mode, an affine flag in CU/PU level is signalled in the bitstream. An affine motion vector prediction (MVP) candidate list with two candidates as $\{(MVP^0{}_0, MVP^0{}_1), (MVP^1{}_0, MVP^1{}_1)\}$ is built. Rate-distortion cost is used to determine which whether ($MVP^0{}_0$, $MVP^0{}_1$) or ($MVP^1{}_0$, $MVP^1{}_1$) is selected as the affine motion vector prediction of the current CU/PU. If ($MVP^x{}_0$, $MVP^x{}_1$) is selected, then $MV_0$ is coded with $MVP^x{}_0$ as the prediction and $MV_0$ is coded with $MVP^x{}_1$ as the prediction. The index to indicate the position of the selected candidate in the list is signalled for the current block in the bit-stream.

Figure 3:
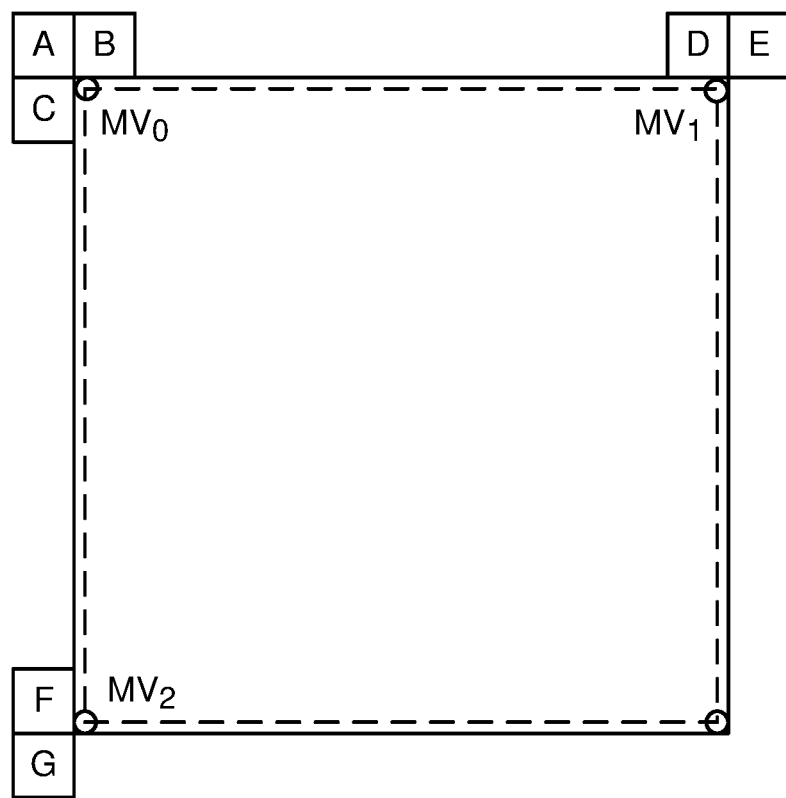
FIG. 3 illustrates an exemplary Affine_Inter mode.

The construction procedure of the affine MVP candidate list is as follows. Collect MVs from three groups. For example, G0: {MV-A, MV-B, MV-C}, G1: {MV-D, MV-E}, G2 {MV-F, MV-G}. Block A, B, C, D, E, F and G are shown in FIG. 3. First, take the motion vector of the block that referring to the target reference picture. Then, if that's not available, use the motion vector that matches the motion vector scaled to the target reference picture.

For a triple (MV0, MV1, MV2) from G0, G1, G2, derive a MV2' from MV0 and MV1 with the affine model, then we can get D(MV0, MV1, MV2)=|MV2-MV2'|. Go through all triples from G0, G1 and G2, find the triple (MV00, MV01, MV02) which produces the minimum D, then set $MVP^0{}_0$=MV00, $MVP^0{}_1$=MV01. If there are more than one available triples, find the (MV10, MV11, MV12) which produces the second minimum D, then set $MVP^1{}_0$=MV10, $MVP^1{}_1$=MV11. If the candidates are not fulfilled, the MVP candidates for non-affine prediction block are derived for the current block. For example, the MVP candidates for non-affine prediction block are MVP_nonaff0 and MVP_nonaff1. If ($MVP^1{}_0$, $MVP^1{}_1$) cannot be found from the triple search, then we set $MVP^1{}_0$=$MVP^1{}_1$=MVP_nonaff0.

After the MVP of the current affine CU/PU is determined, affine motion estimation is applied and the ($MV^0{}_0$, $MV^0{}_1$) is found. Then the difference of ($MV^0{}_0$, $MV^0{}_1$) and ($MVP^x{}_0$, $MVP^x{}_1$) is coded in the bit stream.

Affine motion compensation prediction mentioned above is applied to generate the residues of the current CU/PU. Finally, the residues of the current CU/PU are transformed, quantized, and coded into the bit stream as the traditional procedure.

Affine Merge Mode

Figure 4A:
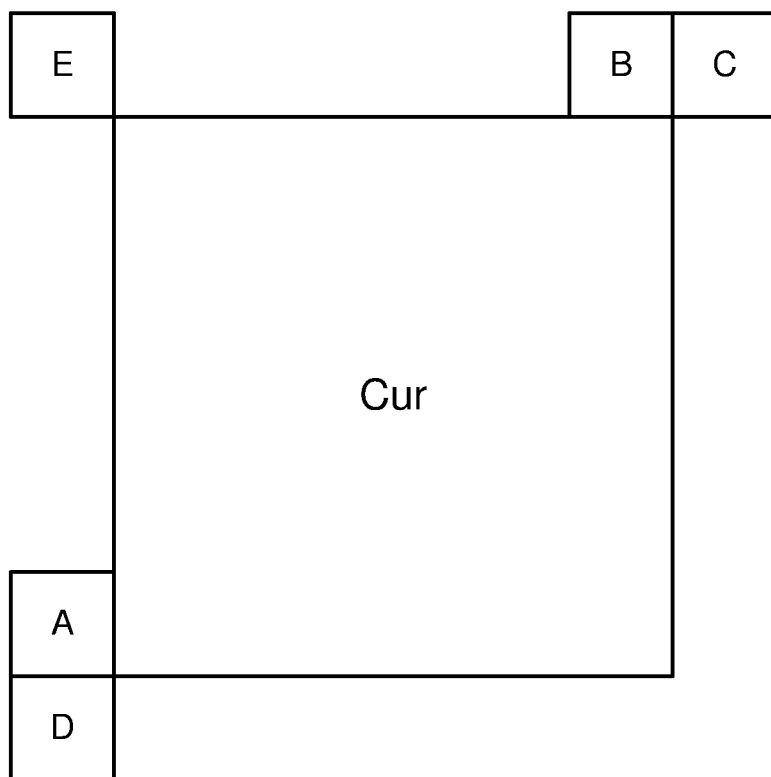
FIG. 4A and FIG. 4B illustrate examples of merge candidates.
Figure 4B:
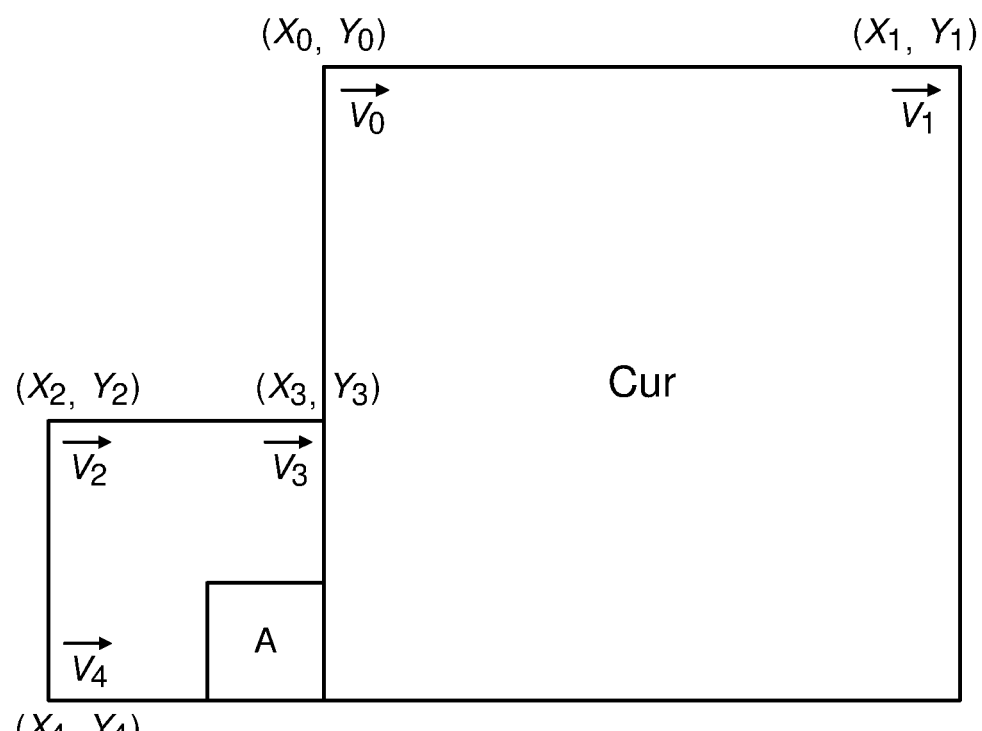

When the current CU/PU is applied in AF_MERGE mode, it gets the first block coded with affine mode from the valid neighbor reconstructed blocks. And the selection order for the candidate block is from left, above, above right, left bottom to above left as shown in FIG. 4A. For example, if the neighbor left bottom block A is coded in affine mode as shown in FIG. 4B, the motion vectors $v_2$, $v_3$ and $v_4$ of the top left corner, above right corner and left bottom corner of the CU/PU which contains the block A are derived. The motion vector $v_0$ of the top left corner on the current CU/PU is calculated according to $v_2$, $v_3$ and $v_4$. Similarly, the motion vector $v_1$ of the above right of the current CU/PU is calculated based on $v_2$, $v_3$, and $v_4$.

After the CPMV of the current CU/PU $v_0$ and $v_1$ are achieved, according to the simplified affine motion model defined in equation (2), the MVF of the current CU/PU is generated. Then Affine Motion Compensated Prediction ("MCP") is applied.

In order to identify whether the current CU/PU is coded with AF_MERGE mode, an affine flag is signalled in the bit stream when there is at least one neighbor block coded in affine mode. If no affine block neighbor the current block exists as shown in FIG. 4A, no affine flag is written in the bit stream.

To indicate the affine merge mode, one affine_flag is signaled if the merge flag is 1. If the affine_flag is 1, the current block is coded with the affine merge mode, and no merge index is signaled. If affine_flag is 0, the current block is coded with the normal merge mode, and a merge index is signaled followingly. The table below shows the syntax design.

| | |
|---|---|
| merge_flag | Ae |
| if( merge_flag){ | |
|   affine_flag | Ae |
|   if(!affine_flag) | |
|     merge_index | Ae |
| } | |

Entropy Coding for Affine Model

In HEVC, context-adaptive binary arithmetic coding (CABAC) is used to convert a symbol into a binarized value. And this process is called binarization. Binarization enables efficient binary arithmetic coding via a unique mapping of non-binary syntax elements to a sequence of bits, which are called bins.

In JEM2.0 reference software, for affine merge mode, only the affine flag is coded, and the merge index is inferred to be the first available neighboring affine model in the predefined checking order A-B-C-D-E as shown in FIG. 4A. This checking order is similar to what was discussed with respect to FIG. 1A. Where left (0) has block A prioritized first before blocks B-E. Then above (1) has block B prioritized next, over blocks C-E. Followed by above right (2) has block C prioritized over block D-E. Below left (3) has block D prioritized over block E. Finally, above left (4) which prioritized last.

For the affine inter mode, two MVD syntaxes are coded for each prediction list indicating the motion vector difference between derived affine motion vector and predicted motion vector.

Four-Parameter (Two MVs) Affine and Six-Parameter (Three MVs) Affine

A block with affine prediction may choose to use four-parameter affine model or six-parameter affine model adaptively.

An affine model with six ("6") parameters is defined as $$\begin{cases} mv_x = ax + by + e \\ mv_y = cx + dy + f \end{cases} \quad (3)$$

Figure 5:
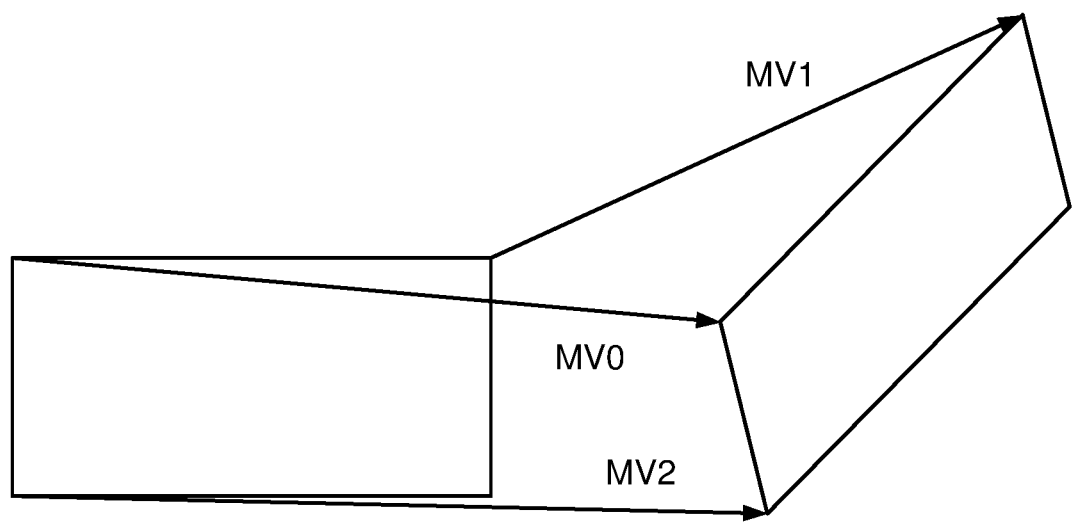
FIG. 5 illustrates an Affine model with six parameters (three motion vectors).

An affine model with six ("6") parameters has three control points. In other words, an affine model with six ("6") parameters is determined by three motion vectors as shown in FIG. 5. MV0 is the first control point motion vector on top left corner, MV1 is the second control point motion vector on above right corner of the block, and MV2 is the third control point motion vector on left bottom corner of the block, as shown in FIG. 2.

The affine model built with the three motion vectors is calculated as $$\begin{cases} mv_x = \dfrac{(mv_{1x} - mv_{0x})}{w}x + \dfrac{(mv_{2x} - mv_{0x})}{h}y + mv_{0x} \\ mv_y = \dfrac{(mv_{1y} - mv_{0y})}{w}x + \dfrac{(mv_{2y} - mv_{0y})}{h}y + mv_{0y} \end{cases} \quad (4)$$

It may also to switch between affine models with four and six parameters. For example, a switchable affine motion prediction scheme is set forth in the patent publication US2017/0332095A1.

More Motion Vector Prediction Methods for Affine Modeling

A similar manner as affine-merge to derive the motion vectors of the top left corner and the above right corner as described with reference to Affine Merge Mode (set forth above) may also be used to derive the MVPs for the top left corner, the above right corner and the below left corner.

Examples of Unified Merge Candidate List Construction

As outlined in the introduction to the solution, affine merge candidates and normal merge candidates may be unified into a unified candidate list. Improvements are outlined according to examples set forth below. The following methods may be applied individually. Alternatively, any combination of them may be applied.

A unified merge candidate list construction procedure which may be applied to conventional (prior to the introduction of a new solution in this disclosure) translational motion merge mode and affine motion merge mode, and/or other kinds of motion merge modes is set forth. Therefore, when a current block is coded with the merge mode (merge_flag is 1), no flag, such as affine_flag, needs to be signaled to indicate whether affine merge is used.

In one example, a merge index may be signaled to indicate which merge candidate in the unified merge candidate list is used. That is to say, the merge index may indicate which candidate in the unified candidate list is associated with the motion vector of the encoded current block of video data (from perspective of the video decoder). If from the perspective of the video encoder which candidate in the unified candidate list may be associated with the motion vector of the current block of video data about to be encoded.

The merge index when signaled may be represented as a flag. The flag may be signed in the bitstream by one or more bits. In addition, the merge index associated with a unified merge candidate list, or "unified candidate list" is different than in other techniques. For example, in conventional merge mode, the merge index is an index that may be used to identify up to five candidates in HEVC, or up to seven candidates in VVC. However, in a unified candidate list, the candidates for motion vectors may be identified arising from translation motion, e.g., as in a conventional merge candidate list. The candidates also may also be identified arising from non-translational motion, e.g., rotation and/or zoom, as in affine motion. Thus, a merge index may be a value from zero ("0") to seven ("7") plus the number of affine motion candidates in an affine merge candidate list. In one example, there may be up to four ("4") candidates that may arise from affine motion. However, as processing power for processors increases, it may be possible to use or identify more than four candidates for affine motion.

Thus, after a candidate in the unified candidate list, is identified based on the merge index, the corresponding motion vector associated with the of the encoded current block of video data, may be used to select one or more motion vectors of a candidate from the unified candidate list.

As such, a in a video encoder a device may include one or more processors configured to select one or more motion vectors corresponding to translational motion of a normal merge candidate. The one or more processors may be configured to select one or more motion vectors corresponding to affine motion of an affine merge candidate. In addition, the one or more processors may be used to construct a unified candidate list comprising more than one normal merge candidate, and more than one affine merge candidate. Once the unified candidate list is constructed, the one or more processors may be configured to assign a merge index to each of the more than one normal merge candidate and each of the more than one affine merge candidate in the unified candidate list, based on a prioritization order of the more than one affine merge candidate and the more than one normal merge candidate, and a rate distortion cost as part of the prioritization. In addition, each merge index in the unified candidate list may be represented in a bitstream, and the unified candidate list may also be represented in the bitstream. Both the unified candidate list and the each merge index in the bitstream may be provided (to a bus or memory) by one or more processors. An antenna may be configured to further transmit the bitstream, wirelessly.

A person having ordinary skill in the art would recognize that once one or more motion vectors of the candidate from the unified candidate list are selected, a predictor block of video data may be determined.

With respect to decoding, the predictor block, may be used to reconstruct the current video block by the video decoder. That is to say, there may be a video decoder that includes a memory configured to store the reconstructed current block of video data. The video decoder may also include one or more processors configured to receive a bitstream including encoded video data, wherein the encoded video data includes an encoded current block of video data. The one or more processors in the video decoder may also be configured to receive a one or more bits, in the bitstream, that represent a flag, and indicate the encoded current block of video data was encoded based on a unified candidate list that includes motion vector candidates based on one or more translational motion vectors, and motion vector candidates based on one or more affine motion vectors. In addition, the one or more processors in the video coder may be configured to receive a merge index, in response to the one or more bits that represent the flag, the merge index indicates which candidate in the unified candidate list is associated with the motion vector of the encoded current block of video data. In addition, the one or more processors in the video decoder may be configured to select one or more motion vectors of a candidate from the unified candidate list, based on the merge index, where the candidate has one or more of the motion vectors corresponding to the translational motion vectors or affine motion vectors within the unified candidate list. Once the one or more processors in the video decoder select the one or more motion vectors from the candidate list, the one or more processors may be configured to determine a predictor block of video data and reconstruct the current block of video data based on the predictor block of video data.

The candidate when it includes one or more motion vectors corresponding to the translational motion vectors is a normal merge candidate in the unified candidate list, and when the candidate includes one or more motion vectors corresponding to affine motion is an affine merge candidate in the unified candidate list.

In addition, the motion vectors of the normal merge candidate from the unified list and select the motion vectors of the affine merge candidate from the unified list, may be based on a prioritization order of the normal merge candidate and affine merge candidate in the unified candidate list.

In another example, whether the current block selects conventional translational motion or affine motion compensation may depend on the merge candidate list and/or the merge index, and/or spatial and/or temporal neighboring blocks. For example, there may be an order dependency which is discussed further with respect to FIG. 8A-8E.

Affine merge candidates may be identified during the merge list construction procedure. If the current block is coded as the merge mode and chooses to use a merge candidate marked as the affine merge candidate, the current block may apply the affine motion compensation, with the motion information of control points provided by the affine merge candidate.

The unified merge candidate list construction procedure determines merge candidate(s) with which merge_index(s) is (are) merge affine candidate(s). An affine merge candidate provides the motion information of multiple control points, such as two control points with the 4-parameter affine model, three control points with the 6-parameter affine model.

In some cases, the unified merge candidate list construction procedure marks, that is determines, that some merge candidates (one or more) may be considered as the affine merge candidates.

Alternatively, the unified merge candidate list construction procedure may mark no candidate as the affine merge candidate. The decision of how many affine merge candidates are included in the merge candidate list may depend on some conditions, including but not limited to: the availabilities of spatial and/or temporal neighboring blocks; the coding modes of spatial and/or temporal neighboring blocks; the motion information of spatial and/or temporal neighboring blocks; the block width and/or height of spatial and/or temporal neighboring blocks; block width and/or height of the current block; whether affine prediction is allowed at sequence, picture or slice level. Spatial neighboring blocks may include adjacent and non-adjacent neighboring blocks.

Figure 6:
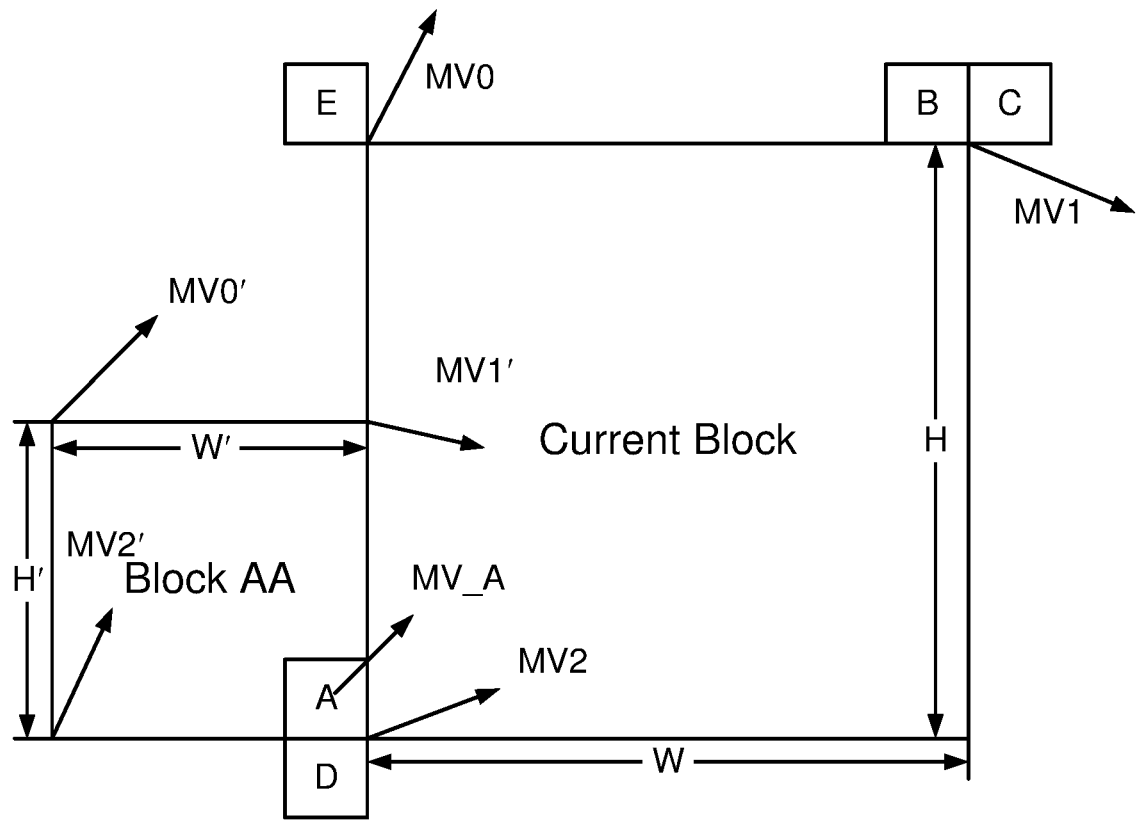
FIG. 6 illustrates a merge affine candidate and a normal candidate.

In one example, if a neighboring block X belongs to a CU coded with affine prediction, then one affine merge candidate is derived from the neighboring block X. FIG. 6 shows an example. Neighboring block A belongs to a CU block AA, which is coded with affine prediction. Then an affine merge candidate may be derived from block A.

Suppose the MVs of the three control points of block AA are MV0', MV1', MV2'; the width and height of block AA are W' and H'; the coordinate of the top-left pixel of block AA is (x', y'); the width and height of the current block are W and H; the coordinate of top-left pixel the current block is (x, y). Then MVs of the three control points of the current block of the derived affine merge candidate may be calculated as $$\begin{cases} mv0_x = \frac{(mv'_{1x} - mv'_{0x})}{w'}(x - x') + \frac{(mv'_{2x} - mv'_{0x})}{h'}(y - y') + mv'_{0x} \\ mv0_y = \frac{(mv'_{1y} - mv'_{0y})}{w'}(x - x') + \frac{(mv'_{2y} - mv'_{0y})}{h'}(y - y') + mv'_{0y} \end{cases} \quad (5)$$

-continued $$\begin{cases} mv1_x = \frac{(mv'_{1x} - mv'_{0x})}{w'}(x+w-x') + \frac{(mv'_{2x} - mv'_{0x})}{h'}(y-y') + mv'_{0x} \\ mv1_y = \frac{(mv'_{1y} - mv'_{0y})}{w'}(x+w-x') + \frac{(mv'_{2y} - mv'_{0y})}{h'}(y-y') + mv'_{0y} \end{cases} \quad (6)$$

$$\begin{cases} mv2_x = \frac{(mv'_{1x} - mv'_{0x})}{w'}(x-x') + \frac{(mv'_{2x} - mv'_{0x})}{h'}(y+h-y') + mv'_{0x} \\ mv2_y = \frac{(mv'_{1y} - mv'_{0y})}{w'}(x-x') + \frac{(mv'_{2y} - mv'_{0y})}{h'}(y+h-y') + mv'_{0y} \end{cases} \quad (7)$$

In one example, if a neighboring block X belongs to a CU coded with affine prediction. In another example, MVs of the three control points of the current block of the derived affine merge candidate may be calculated as $$\begin{cases} mv0_x = \frac{(mv'_{1x} - mv'_{0x})}{w'}(x-x') - \frac{(mv'_{1y} - mv'_{0y})}{w'}(y-y') + mv'_{0x} \\ mv0_y = \frac{(mv'_{1y} - mv'_{0y})}{w'}(x-x') + \frac{(mv'_{1x} - mv'_{0x})}{w'}(y-y') + mv'_{0y} \end{cases} \quad (8)$$

$$\begin{cases} mv1_x = \frac{(mv'_{1x} - mv'_{0x})}{w'}(x+w-x') - \frac{(mv'_{1y} - mv'_{0y})}{w'}(y-y') + mv'_{0x} \\ mv1_y = \frac{(mv'_{1y} - mv'_{0y})}{w'}(x+w-x') + \frac{(mv'_{1x} - mv'_{0x})}{w'}(y-y') + mv'_{0y} \end{cases} \quad (9)$$

$$\begin{cases} mv2_x = \frac{(mv'_{1x} - mv'_{0x})}{w'}(x-x') - \frac{(mv'_{1y} - mv'_{0y})}{w'}(y+h-y') + mv'_{0x} \\ mv2_y = \frac{(mv'_{1y} - mv'_{0y})}{w'}(x-x') + \frac{(mv'_{1x} - mv'_{0x})}{w'}(y+h-y') + mv'_{0y} \end{cases} \quad (10)$$

In another example, MV0 and MV1 are calculated by (5)(6) or (8)(9), and MV2 are then calculated as $$\begin{cases} mv2_x = \frac{(mv_{1y} - mv_{0y})}{w}h + mv_{0x} \\ mv2_y = \frac{(mv_{1x} - mv_{0x})}{w}h + mv_{0y} \end{cases} \quad (11)$$

In one example, the inter prediction direction (Uni-prediction from List0, Uni-prediction from List1, or Bi-prediction) of the affine merge candidate is equal to the inter prediction direction of the affine-coded neighboring block from which it is derived.

In the example of FIG. 6, if affined coded block AA uses uni-prediction from reference picture X in List0, then the corresponding affine merge candidate of the current block also uses uni-prediction from List0, and only control point MVs referring to the reference picture X in List0 are derived; if affined coded block AA uses uni-prediction from the reference picture Y in List1, then the corresponding affine merge candidate of the current block also uses uni-prediction from List1, and only control point MVs referring to the reference picture Y in List1 are derived; if affined coded block AA uses bi-prediction from the reference picture X in List0 and the reference picture Y in List1, then the corresponding affine merge candidate of the current block also uses bi-prediction, and control point MVs both referring to the reference picture X in List0 and the reference picture Y in List1 are derived.

Alternatively, the inter prediction direction may be derived from multiple affine merge candidates in the merge candidate list. In one example, if one affine merge candidate is derived from the neighboring block X and appended into the merge candidate list, then the normal merge candidate from the neighboring block X is not appended into the merge candidate list.

In the example of FIG. 6, neighboring block A belongs to a CU block AA, which is coded with affine prediction. Then an affine merge candidate may be derived from block A. But the normal merge candidate from block A is not appended into the merge candidate list. In this example, the motion vector MV_A is not appended into the merge candidate list.

In one example, if one affine merge candidate is derived from the neighboring block X and appended into the merge candidate list, then the normal merge candidate from the neighboring block X is appended into the merge candidate list after the affine merge candidate from neighboring block X.

In the example of FIG. 6, neighboring block A belongs to a CU block AA, which is coded with affine prediction. Then an affine merge candidate may be derived from block A. Then the normal merge candidate from block A is appended into the merge candidate list after the affine merge candidate with control point MVs (MV0, MV1, MV2). In this example, the motion vector MV_A is appended into the merge candidate list.

In one example, the normal merge candidate from the neighboring block X is appended into the merge candidate first. If one affine merge candidate may be derived from the neighboring block X, the affine merge candidate is appended into the merge candidate list after the normal merge candidate from the neighboring block X.

In the example of FIG. 6, the motion vector MV_A is appended into the merge candidate list. Then if neighboring block A belongs to a CU block AA, which is coded with affine prediction, an affine merge candidate may be derived from block A and appended into the candidate list after the normal merge candidate.

Figure 7:
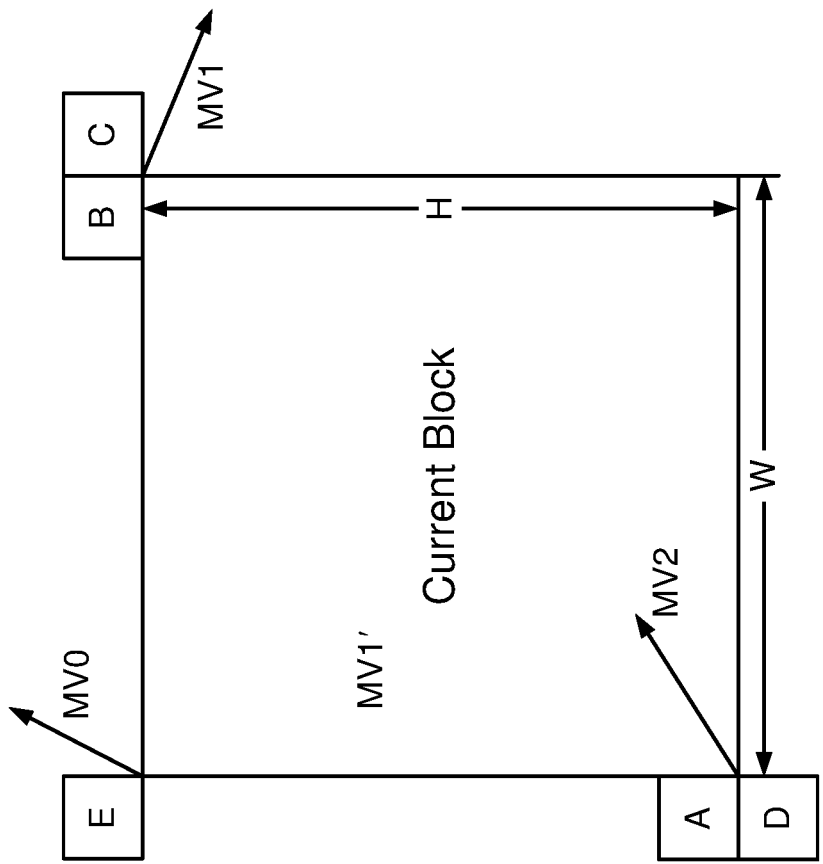
FIG. 7 illustrates a merge affine candidate derived from a non-adjacent block.
Figure 7:
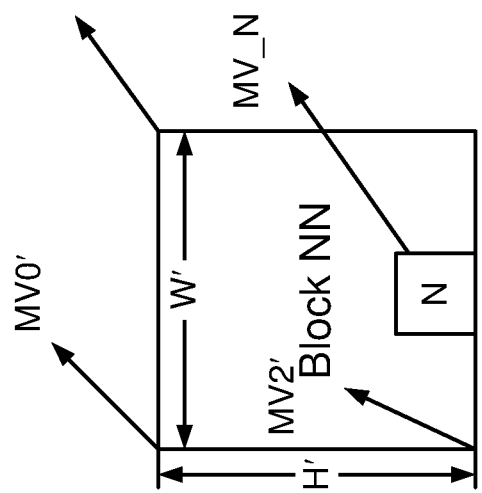

In one example, the merge affine candidate may be derived from a non-adjacent neighboring block in the current picture. FIG. 7 shows an example. Block N is a non-adjacent neighboring block. Block N belongs to a CU block NN, which is coded with affine prediction. Then an affine merge candidate may be derived from block N. Suppose the MVs of the three control points of block NN are MV0', MV1', MV2'; the width and height of block AA are W' and H'; the coordinate of the top-left pixel of block NN is (x',y'); the width and height of the current block are W and H; the coordinate of top-left pixel the current block is (x, y). Then MVs of the three control points of the current block of the derived affine merge candidate may be calculated as (5)(6)(7) or (8)(9)(10). Alternatively, MV0 and MV1 are calculated by (5)(6) or (8)(9), and MV2 are then calculated as (11).

It may also be possible that if block X is a non-adjacent neighboring block, that the three preceding examples are also possible. That is, even if block X is a non-adjacent neighboring block, then (a) if one affine merge candidate is derived from the neighboring block X and appended into the merge candidate list, then the normal merge candidate from the neighboring block X is appended into the merge candidate list after the affine merge candidate from neighboring block X; (b) if one affine merge candidate may be derived from the neighboring block X, the affine merge candidate is appended into the merge candidate list after the normal merge candidate from the neighboring block X; and (c) the merge affine candidate may be derived from a non-adjacent neighboring block in the current picture.

Consider the example of FIG. 7, where a non-adjacent neighboring block N belongs to a CU block NN, which is coded with affine prediction. Then an affine merge candidate may be derived from block N. But the normal merge candidate from block N is not appended into the merge candidate list. In this example, the motion vector MV_N is not appended into the merge candidate list.

Alternatively, in the example of FIG. 7, an affine merge candidate may be derived from non-adjacent neighboring block N. Then the normal merge candidate from block N is appended into the merge candidate list after the affine merge candidate with control point MVs (MV0, MV1, MV2). In this example, the motion vector MV_N is appended into the merge candidate list. Alternatively, in the example of FIG. 7, the motion vector MV_N is appended into the merge candidate list. Then if non-adjacent neighboring block N belongs to a CU block NN, which is coded with affine prediction, an affine merge candidate may be derived from block N and appended into the candidate list after the normal merge candidate.

Affine merge candidates may be pruned. Two affine merge candidates are identical if all the following conditions are true:
(1) they have the same inter-prediction directions (Uni-prediction from List0, Uni-prediction from List1, or Bi-prediction);
(2) then have the same reference picture in ListX if Uni-prediction from ListX (X being 0 or 1) is used or same reference picture in ListX and same reference picture in ListY (Y!=X) if Bi-prediction is use;
(3) they have the same motion vectors for multiple control points (such as MV0, MV1, and MV2 shown in FIG. 6) for ListX if Uni-prediction from ListX is used or same motion vectors for multiple control points for both ListX and ListY (Y!=X) if Bi-prediction is used.

Alternatively, two affine merge candidates are identical if all the following conditions are true:
(1) they have the same inter-prediction directions (Uni-prediction from List0, Uni-prediction from List1, or Bi-prediction);
(2) they have the same reference picture in ListX if Uni-prediction from ListX (X being 0 or 1) is used or same reference picture in ListX and same reference picture in ListY (Y!=X) if Bi-prediction is used;
(3) they have the same motion vectors for multiple control points (such as MV0, MV1 shown in FIG. 6) for ListX if Uni-prediction from ListX is used or same motion vectors for multiple control points for both ListX and ListY (Y!=X) if Bi-prediction is used.

One affine merge candidate is not appended into the merge candidate list if there is one affine merge candidate identical to it.

Insertion of Affine Merge Candidates

In one example, one affine merge candidate is not appended into the merge candidate list, to be part of the unified candidate list, if it has MV0=MV1=MV2.

In another example, one affine merge candidate is not appended into the merge candidate list, to be part of the unified candidate list, if it has MV0=MV1.

In yet another example, no affine merge candidates are allowed in the merge candidate construction process to form the unified candidate list, if the size of the current block is lower than an integer, such as 8×8 or 16×16.

Moreover, no affine merge candidates are allowed in the merge candidate construction process to form the unified candidate list, if Min(W, H) lower than an integer, such as 8 or 16. The width and height of the current block are W and H, respectively.

In addition, no affine merge candidates are allowed in the merge candidate construction process to form the unified candidate list, if Max(W, H) lower than an integer, such as 8 or 16. The width and height of the current block are W and H, respectively.

Order of Affine Merge Candidates and Normal Merge Candidates

In one example, affine merge candidates may be prioritized before all normal merge candidates in the unified merge candidate list. For example, affine merge candidates from neighboring blocks A, B, C and D may be prioritized before all normal merge candidates in the merge candidate list. It should be noted that the order of affine merge candidates and normal merge candidates may be adaptively changed. In one example, it may depend on the motion information/mode information/block sizes of neighboring blocks.

FIG. 8A-8E shows some exemplary merge candidate list construction checking relative orders. The order is relative means other kinds of candidates out of this document may be inserted between two candidates in one or more figures of FIG. 8A-FIG. 8E. However, the relative order of the two candidates does not necessarily change. It should be noted that in this disclosure sometimes the terminology unified candidate list is used and may be synonymous with unified merge candidate list, as the unified merge candidate list comprises candidates from the affine merge mode or the merge mode, i.e., candidates are being merged onto the unified merge candidate list. Though for convenience, the list may also just be called a unified candidate list.

In one example, a spatial/temporal adjacent/non-adjacent neighboring block is considered as an affine block, it is coded with the affine inter mode, or it is coded with the merge/skip mode, and the selected merge candidate is an affine merge candidate. Alternatively, if it is coded with the affine inter mode, not any other modes including merge/skip mode.

When calculating the CABAC context for signaling the affine_flag of a non-merge/skip inter-coded block, a neighboring block is treated as not affine coded if it is coded with the merge/skip mode. Alternatively, when calculating the CABAC context for signaling the affine_flag of a non-merge/skip inter-coded block, a neighboring block is treated as affine coded if it is coded with the merge/skip mode.

In one example, the number of affine merge candidates in the unified merge candidate list is not allowed to be larger than an integer N. For example, N may be a predefined number such as 3 or 5.

Alternatively, N may be adaptively changed in different blocks. Alternatively, N may be signaled from the encoder to the decoder at sequence level such as in Sequence Parameter Set (SPS), at picture level such as in Picture Parameter Set (PPS), at slice level, such as in the slice header, in Coding Tree Unit (CTU) level, Coding Unit (CU) level, or Prediction Unit (PU) level. If the number of affine merge candidates in the unified merge candidate list is N, then no more affine merge candidate should be inserted into the unified merge candidate list. Alternatively, if the number of affine merge candidates in the unified merge candidate list is N, one existing affine merge candidate in the merge candidate list must be removed, if a new affine merge candidate is inserted into the unified merge candidate list.

FIG. 8A-8E represent exemplary unified merge candidate list construction including the checking of relative prioritization orders of candidates. The relative position of a normal merge candidate from a block is as described in FIG. 1A. The relative position of an affine merge candidate from a block is as described in FIG. 4A. In addition, descriptions of FIG. 6 and FIG. 7 relating to affine merge candidates may be applicable where appropriate.

Figure 8A:
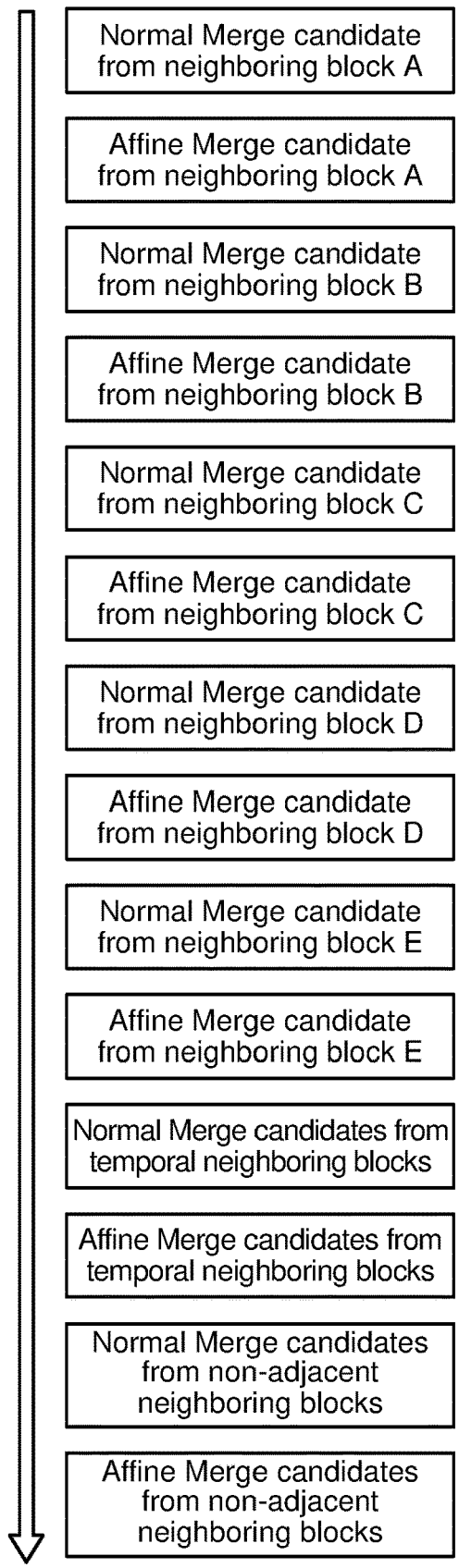
FIG. 8A-8E illustrates exemplary merge candidate list prioritization in a unified candidate list.

For example, in FIG. 8A, the normal merge candidate from neighboring block A, the left block relative to the current block (see FIG. 1A), and the affine merge candidate from neighboring block A (See FIG. 4A), the left block relative to the current block, are prioritized before other normal merge candidate and affine merge candidates from neighboring blocks, B-E. The other block candidate orders to check for associated motion vectors are as follows: Both normal merge candidates and affine merge candidates from block B are prioritized next, over normal merge candidates and affine merge candidates from blocks C-E. Next, normal merge candidates and affine merge candidates from block C are prioritized over normal merge candidates and affine merge candidates from blocks D-E. Normal merge candidates and affine merge candidates are prioritized over normal merge and affine merge candidate block E. Finally, normal merge and affine merge candidates from block E are prioritized last.

Figure 8B:
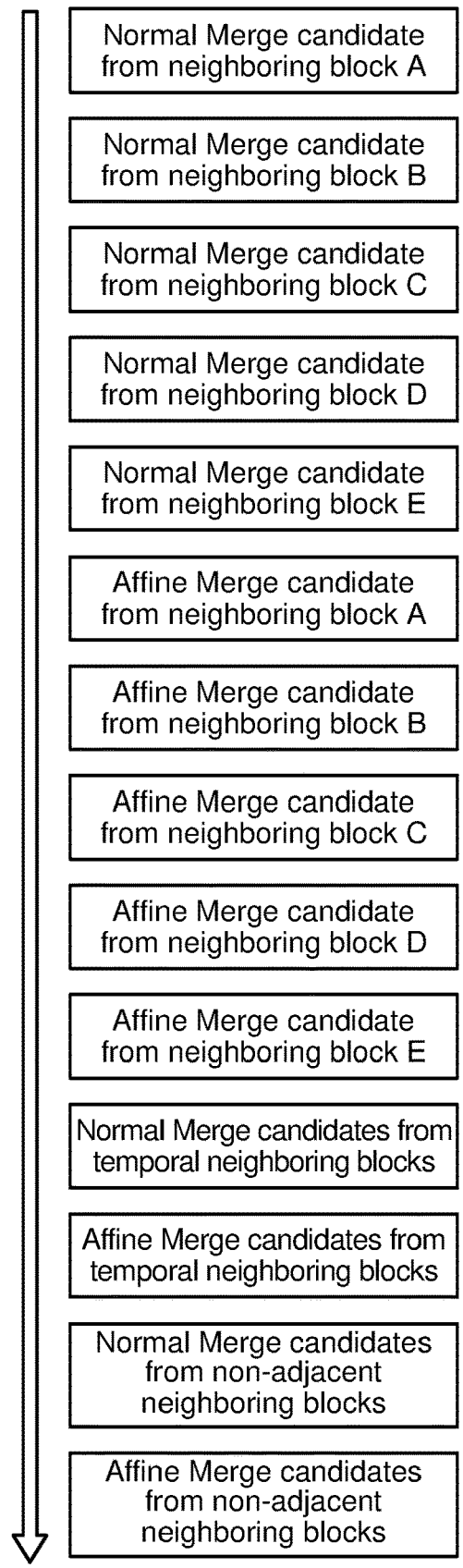

In FIG. 8B, for example, the, normal merge candidates from spatial neighboring blocks A-E are prioritized over affine merge candidates from spatial neighboring blocks A-E. Then the temporal normal merge candidates are prioritized over the temporal affine merge candidates. The normal merge candidates from non-adjacent spatial neighboring blocks are checked next. Finally, the affine merge candidates from non-adjacent spatial neighboring blocks are checked.

Figure 8C:
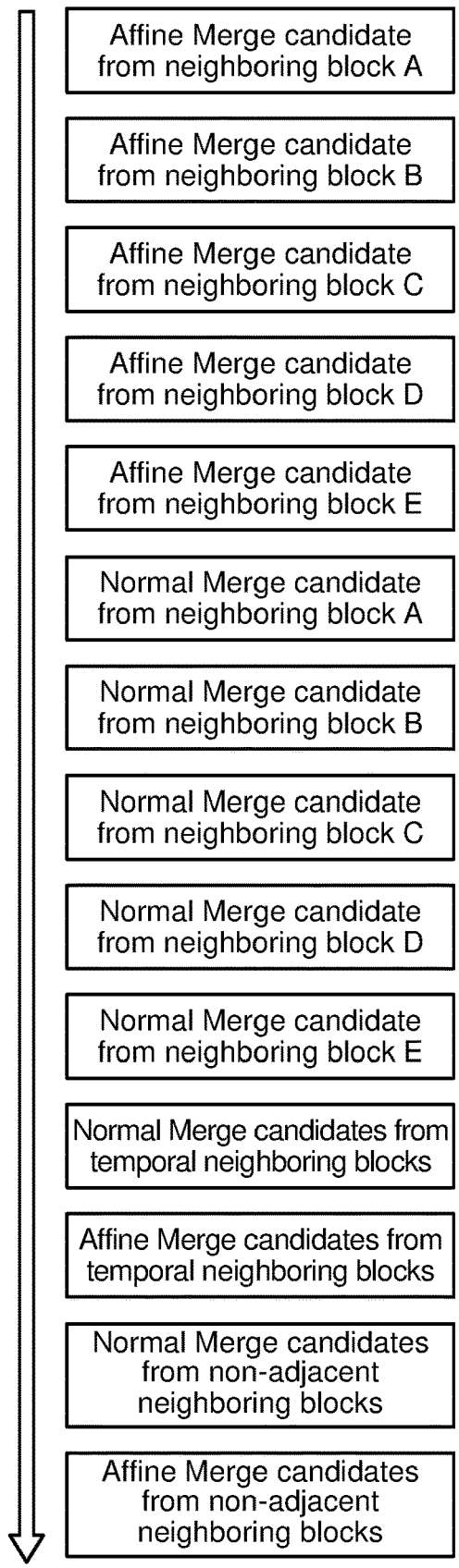

In FIG. 8C, for example, the, affine merge candidates from spatial neighboring blocks A-E are prioritized over normal merge candidates from spatial neighboring blocks A-E. Then the temporal normal merge candidates are prioritized over the temporal affine merge candidates. The normal merge candidates from non-adjacent spatial neighboring blocks are checked next. Finally, the affine merge candidates from non-adjacent spatial neighboring blocks are checked.

Figure 8D:
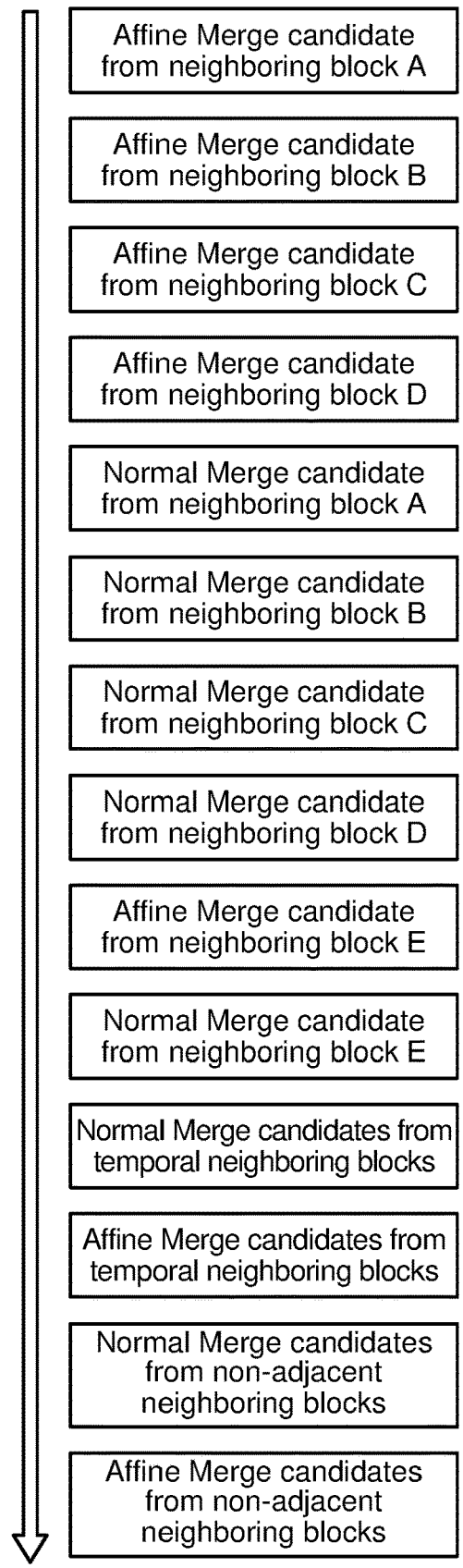

In FIG. 8D, for example, is similar to the checking order in FIG. 8C, however, affine merge candidate from block E and normal merge candidate from block E are prioritized after affine merge candidates from blocks A-D and normal merge candidates from blocks A-D. Then, affine merge candidates from spatial neighboring blocks A-E are prioritized over normal merge candidates from spatial neighboring blocks A-E. Then the temporal affine merge candidates are prioritized over the temporal normal merge candidates. The affine merge candidates from the non-adjacent spatial neighboring blocks can are checked next. Finally, the normal merge candidates from non-adjacent spatial neighboring blocks are checked.

Figure 8E:
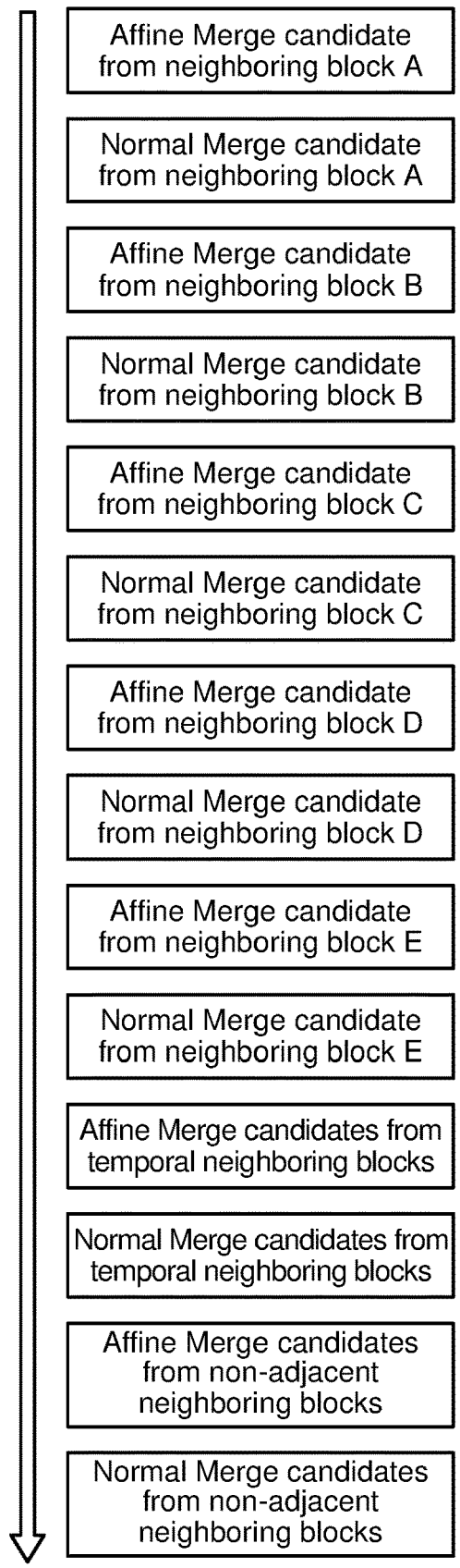
Figure 9A:
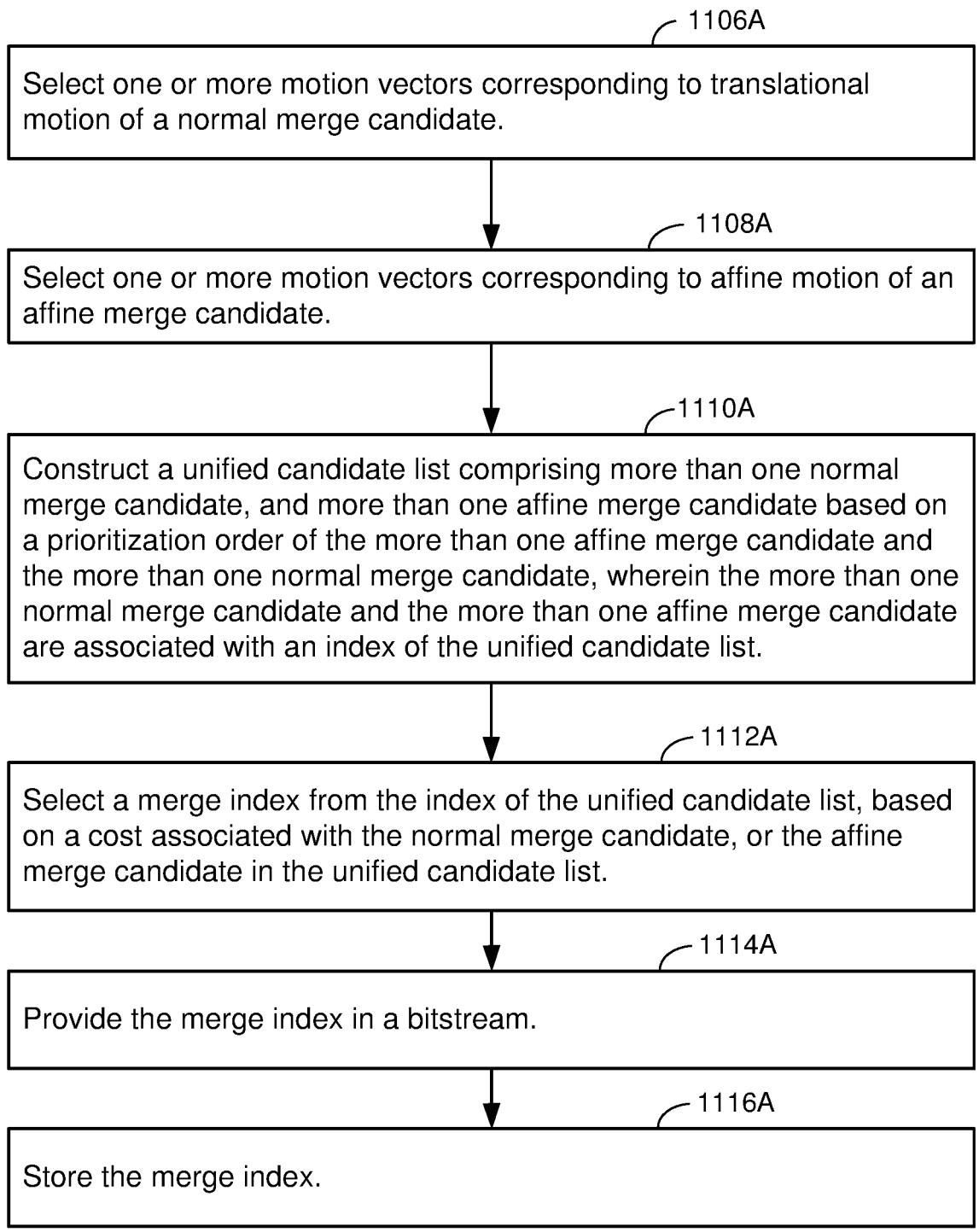
FIG. 9A illustrates a flowchart used for video encoding with one or more techniques described in this disclosure.

In FIG. 8E, for example, the affine merge candidate, from neighboring block A, the left block relative to the current block (see FIG. 4A), and the normal merge candidate, from the neighboring block A (See FIG. 1A), the left block relative to the current block, are prioritized before other merge candidates from neighboring blocks, B-E. The other candidates checking order is as follows: Affine merge and normal merge candidates from block B are prioritized next, over affine merge candidates and normal merge candidates from blocks C-E. Followed by affine merge and normal merge candidates from above block C are prioritized over affine merge and normal merge candidates from blocks D-E. Affine merge candidates and normal merge candidates from block D are prioritized over affine merge candidates and normal merge candidates from block E. Finally, affine merge and candidate and normal merge candidate from block E are prioritized last. FIG. 9A illustrates a flowchart used for video encoding with one or more techniques described in this disclosure. The device, for video encoding an encoded current block of video data, may include one or more processors that may be configured to select one or more motion vectors corresponding to translational motion of a normal merge candidate 1106A. In addition, the one or more processors may be configured to construct a unified candidate list comprising more than one normal merge candidate, and more than one affine merge candidate based on a prioritization order of the more than one affine merge candidate and the more than one normal merge candidate, wherein the more than one normal merge candidate and the more than one affine merge candidate are associated with an index of the unified candidate list 1108A. Moreover, the one or more processors may be configured to select a merge index from the index of the unified candidate list, based on a cost associated with the normal merge candidate, or the affine merge candidate in the unified candidate list. The one or more processors may be configured to provide the merge index in a bitstream. Finally, the device may include a memory configured to store the merge index 1116A.

Figure 9B:
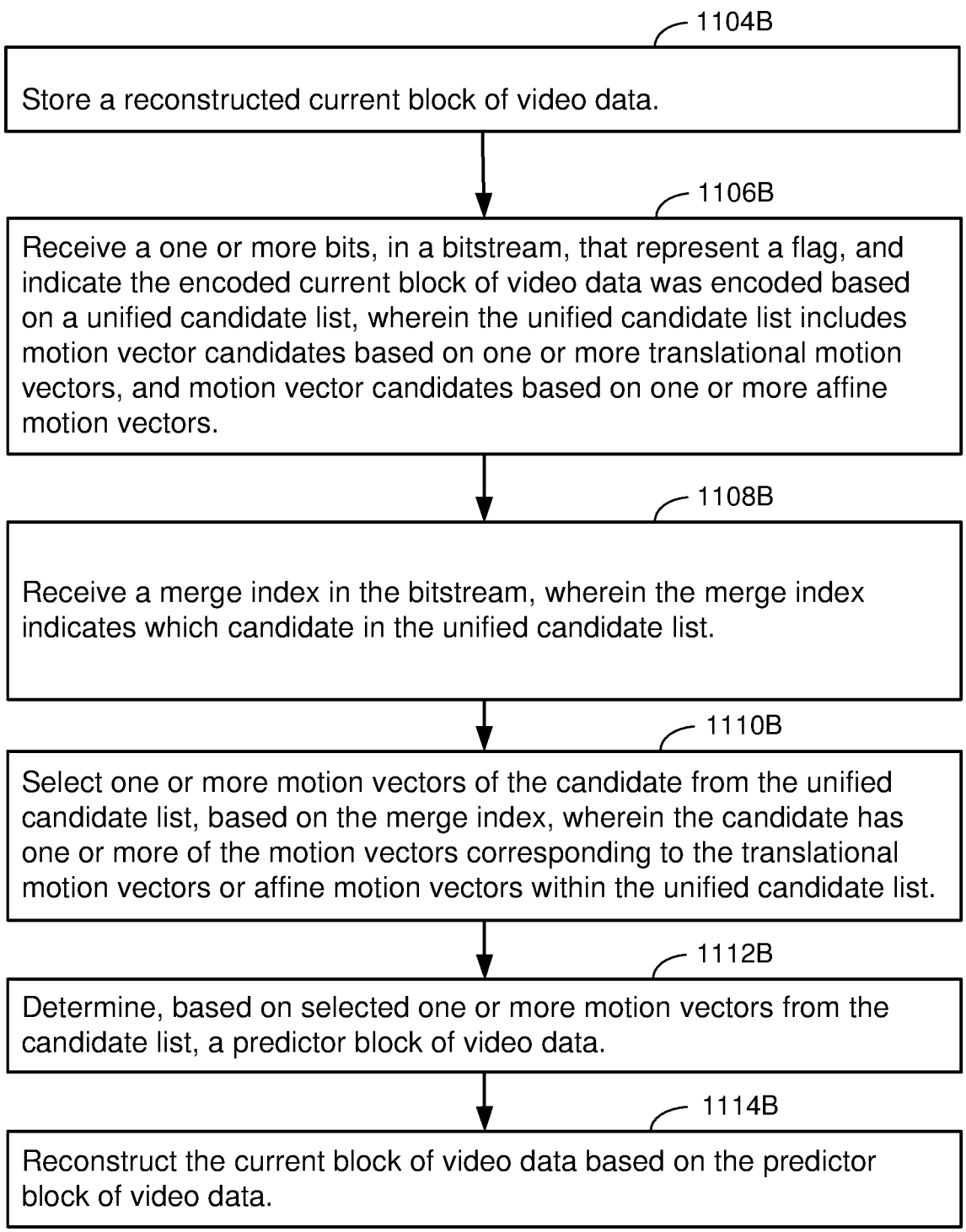
FIG. 9B illustrates a flowchart used for video decoding with one or more techniques described in this disclosure.

FIG. 9B illustrates a flowchart used for video decoding with one or more techniques described in this disclosure. The device may include a memory configured to store a reconstructed current block of video data 1104B. The device, for video decoding an encoded current block of video data, may include one or more processors that may be configured to receive a one or more bits, in the bitstream, that represent a flag, and indicate the encoded current block of video data was encoded based on a unified candidate list that includes motion vector candidates based on one or more translational motion vectors, and motion vector candidates based on one or more affine motion vectors 1106B. In addition, the one or more processors may be configured to receive a merge index, that indicates which candidate in the unified candidate list is associated with the motion vector of the encoded current block of video data 1108B. Moreover, the one or more processors may be configured to select one or more motion vectors of a candidate from the unified candidate list, based on the merge index, where the candidate has one or more of the motion vectors corresponding to the translational motion vectors or affine motion vectors within the unified candidate list 1110B. The one or more processors may also be configured to determine, based on selected one or more motion vectors from the candidate list, a predictor block of video data 1112B. The one or more processors may be configured to reconstruct the current block of video data based on the predictor block of video data 1114B.

Figure 10:
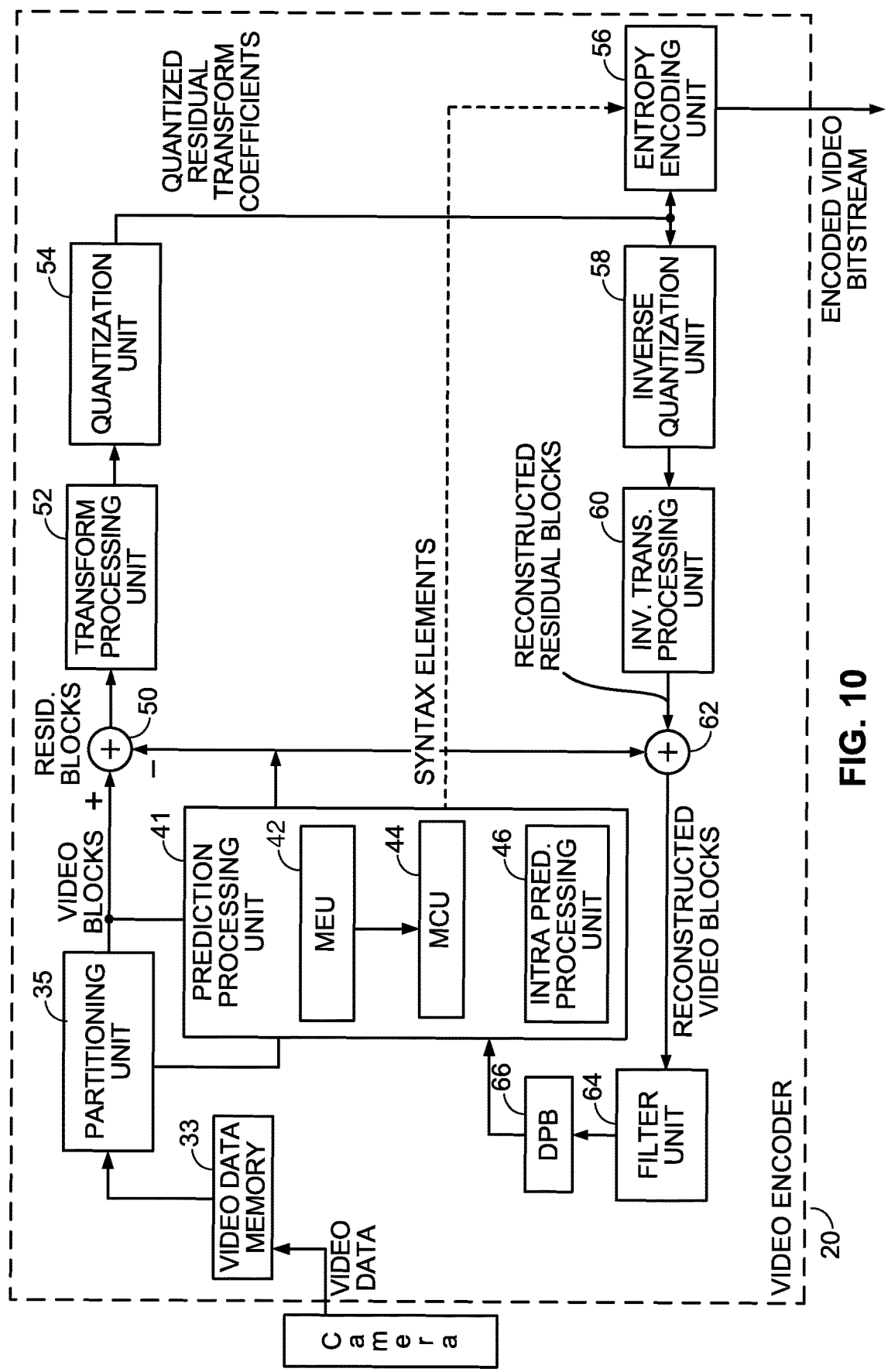
FIG. 10 illustrates an exemplary video encoder that may be used to implement one or more of the techniques described in this disclosure.

FIG. 10 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 10, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, filter unit 64, and decoded picture buffer (DPB) 66.

One or more units illustrated within the video encoder 20 may be part of an Application Specific Integrated Circuit (ASIC). Alternatively, or in addition to, one or more units illustrated within the video encoder 20 may be implemented in one processor, or, alternatively in other embodiments in one or more processors.

As shown in FIG. 10, video encoder 20 receives video data from a camera and stores the received video data along with metadata in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. For example, in a different embodiment, the partitioning unit 35 may generate the sequence parameter set (SPS) and/or picture parameter set (PPS). Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-predicted block to summer 50 to generate residual block data and to summer 62 to reconstruct the encoded block for use as a reference picture.

The prediction processing unit 41 may also be part of one or more processors which may be configured to operate in a merge mode which processes the unified candidate list to predict the motion vectors of the coded block.

The unified candidate list may include a normal merge candidate based on selecting one or more motion vectors corresponding to translational motion. In addition, the candidate list may include an affine merge candidate based on selecting one or more motion vectors corresponding to affine motion. One or more normal merge candidates and one or more affine merge candidates may be used to construct the unified candidate list. The unified candidate list may be based on a prioritization order or a predefined order of the more than one affine merge candidates and the more than one normal merge candidates. In an example, the normal merge candidates and affine merge candidates in the unified candidate list may be associated with an index of the unified candidate list. A merge index, may be selected from the index of the unified candidate list, based on a cost associated with the normal merge candidate, or the affine merge candidate, in the unified candidate list. The video encoder 20 may provide the merge index in a bitstream.

The examples for the unified candidate lists in FIG. 8A-8E may be based on a prioritization order. The prioritization order may itself be a predefined order. Thus, the examples in FIG. 8A-8E may be five different predefined lists based on a prioritization order. Alternatively, they may be five different dynamic lists based on a prioritization order.

The one or more motion vectors of the candidate selected, i.e., the candidate associated with the merge index, may be used to obtain a first prediction block in a reference picture used in encoding, if the encoding is based on uni-directional prediction.

Alternatively, the one or more motion vectors of the candidate selected, i.e., the candidate associated, in inter-mode, with the merge index, may be used to obtain a first prediction block in a first reference picture, and a second prediction block in a second reference picture, during encoding using bi-directional prediction. In an embodiment, the first prediction block may be the final prediction block. Alternatively, in an embodiment the second prediction block may be the final prediction block. In yet another embodiment, the final prediction may be determined from a combination of the first prediction block and the second prediction block.

Moreover, the prediction blocks in the inter-mode may also be based on motion vectors of spatial candidate blocks or temporal candidates block. As an example, the first prediction block and the second prediction block are obtained using motion vectors from spatially neighboring blocks. In another example, the first prediction block and the second prediction block are obtained based on motion vectors of temporally neighboring candidate blocks. In another example, the neighboring candidate blocks are within the group of the same: slice, or tile or LCU or row or picture.

In another example, the neighboring candidate blocks are located in one or more previously coded frames. Moreover, the first prediction block inherits motion information from the neighboring candidate block, and the relative position of the neighboring candidate blocks is pre-defined. In addition, the second prediction block is obtained based on the motion information of a neighboring candidate block according to a predetermined rule.

Intra prediction unit 46 within prediction processing unit 41 may perform intra-predictive coding of the current video block relative to one or more neighboring blocks or samples in the same frame or slice as the current block to be coded to provide spatial compression.

There is a motion estimation unit 42 which may be used conjunction with motion compensation unit 44 within prediction processing unit 41 and may perform inter-predictive coding of the current video block relative to one or more predictive blocks in one or more reference pictures to provide temporal compression.

Motion estimation unit 42 may be configured to determine the motion vector for a video block according to a predetermined pattern for a video sequence. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66.

For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture.

The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the final predictive block for the current video block, either via intra prediction mode or inter prediction mode, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. In another example, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

Filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Filter unit 64 may perform any type of filtering such as deblock filtering, SAO filtering, ALF, and/or GALF, and/or other types of loop filters. A deblock filter may, for example, apply deblocking filtering to filter block boundaries to remove blockiness artifacts from reconstructed video. An SAO filter may apply offsets to reconstructed pixel values in order to improve overall coding quality. Additional loop filters (in loop or post loop) may also be used.

Figure 11:
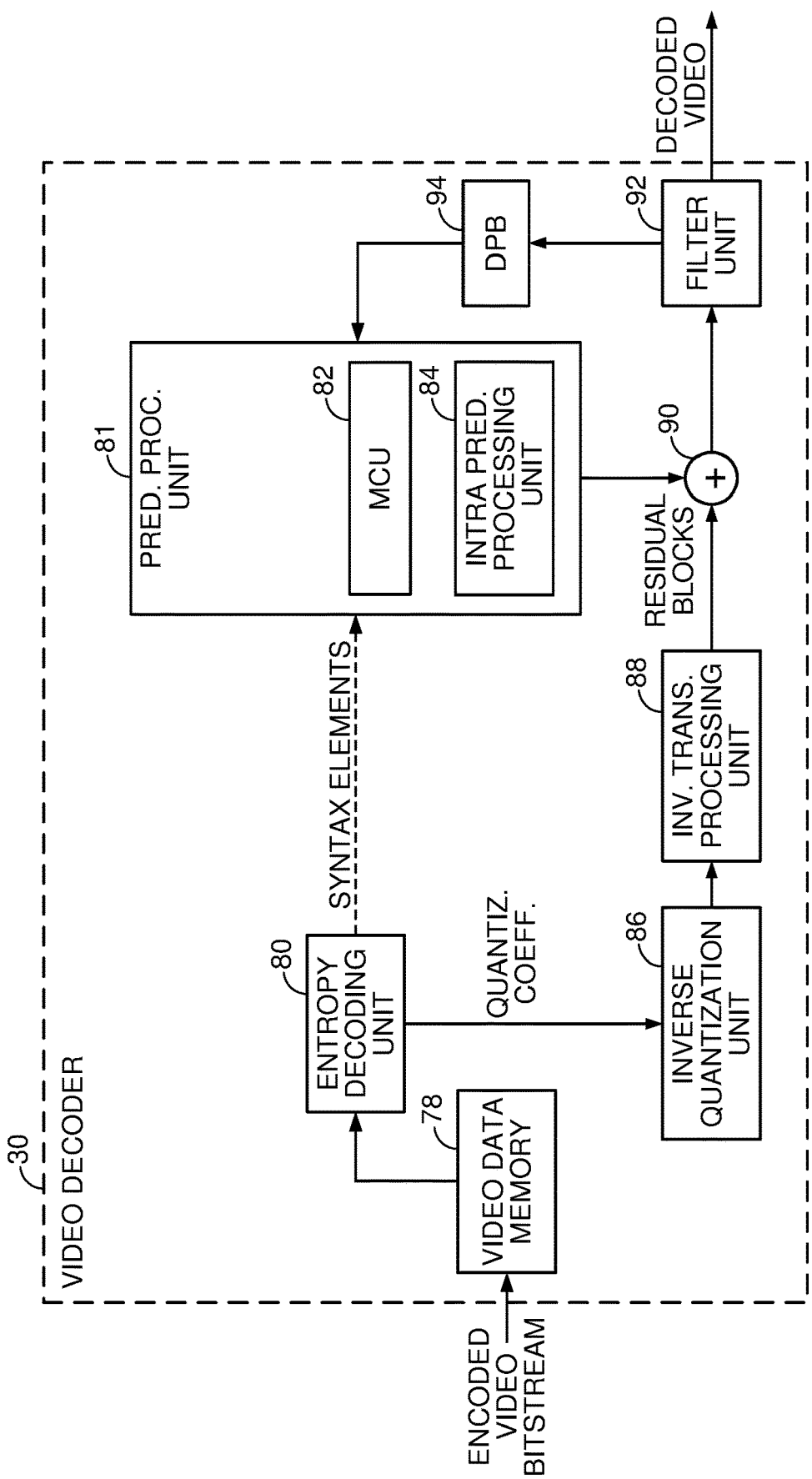
FIG. 11 illustrates an exemplary video decoder that may be used to implement one or more of the techniques described in this disclosure.

FIG. 11 is a block diagram illustrating an example video decoder 30 that may implement the techniques described in this disclosure. Video decoder 30 of FIG. 11 may, for example, be configured to receive the signaling described above with respect to video encoder 20 of FIG. 10. In the example of FIG. 11, video decoder 30 includes video data memory 78, entropy decoding unit 80, prediction processing unit 81, inverse quantization unit 86, inverse transform processing unit 88, summer 90, and DPB 94. Prediction processing unit 81 includes motion compensation unit 82 and intra prediction unit 84. Video decoder 30 may, in some examples, perform a decoding pass generally reciprocal to the encoding pass described with respect to video encoder 20.

One or more units illustrated within the video decoder 30 may be part of an Application Specific Integrated Circuit (ASIC). Alternatively, or in addition to, one or more units illustrated within the video decoder 30 may be implemented in one processor, or, alternatively in other embodiments in one or more processors.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces a final predictive blocks for a video block of the current video slice based on the motion vectors and other syntax elements received from entropy decoding unit 80. The final predictive blocks may be produced from one of the reference pictures within one of the reference picture lists.

The prediction processing unit 81 may also be part of one or more processors which may be configured to operate in a merge mode which processes the unified candidate list.

In such a mode, the one or more processors may be configured to receive a one or more bits, in the bitstream, that represent a flag, and indicate the encoded current block of video data was encoded based on a unified candidate list that includes motion vector candidates based on one or more translational motion vectors, and motion vector candidates based on one or more affine motion vectors. The one or more processors may be configured to also receive a merge index that indicates which candidate in the unified candidate list. The construction may be of a unified candidate list that comprises both normal merge candidates and affine merge candidates. That is, the video decoder may also construct the unified candidate list based on neighboring candidate blocks. The decoder may then select one or more motion vectors of a candidate from the unified candidate list, based on the merge index, where the candidate has one or more of the motion vectors corresponding to the translational motion vectors or affine motion vectors within the unified candidate list. Moreover, the video decoder may determine, based on the selected one or more motion vectors from the candidate list, a predictor block of video data. The predictor block may be a final generated prediction block mentioned above, and reconstruct the current block of video data based on the predictor block of video data. The reconstructed current block of video data may be stored in a memory, e.g. DBP 94.

The prediction processing unit 81 may be part of one or more processors which may be configured to reconstruct the current block of video data and may be reconstructed based on prediction blocks using the motion vectors of the normal merge candidate or affine merge candidate in the unified list.

Moreover, the motion vectors used for prediction may also be from spatial or temporal neighboring candidate blocks. As an example, a first prediction block and a second prediction block are generated using motion vectors from neighboring candidate blocks. In another example, the first prediction block and the second prediction block are generated using motion vectors of spatially neighboring block. In another example, the first prediction block and the second prediction block are generated using temporally neighboring blocks. In another example, the neighboring blocks are within the group of the same: slice, or tile or LCU or ROW or picture.

Video decoder 30 may construct the reference frame lists, List 0 and List 1, using default construction techniques based on reference pictures stored in DPB 94.

Inverse quantization unit 86 inverse quantizes, i.e., dequantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After the prediction processing unit 81 generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation.

Filter unit 92 filters the reconstructed block (e.g. the output of summer 90) and stores the filtered reconstructed block in DPB 94 for uses as a reference block. The reference block may be used by motion compensation unit 82 as a reference block to inter-predict a block in a subsequent video frame or picture. Filter unit 92 may perform any type of filtering such as deblock filtering, SAO filtering, ALF, and/or GALF, and/or other types of loop filters. A deblock filter may, for example, apply deblocking filtering to filter block boundaries to remove blockiness artifacts from reconstructed video. An SAO filter may apply offsets to reconstructed pixel values in order to improve overall coding quality. Additional loop filters (in loop or post loop) may also be used A person having ordinary skill in the art would recognize that depending on the example, certain acts or events of any of the methods described herein may be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code, or instructions may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The coding techniques discussed herein may be embodiment in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. In one example the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general. The techniques may be applied to wireless and/or wired applications. In each case, the captured, pre-captured, or computer-generated video may be encoded by the video encoder. The encoded video information may then be output by output interface onto the computer-readable medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Particular implementations of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

As used herein, "integrated" may include "manufactured or sold devices." A device may be integrated if a user buys a package that bundles or includes the device as part of the package. In some descriptions, two devices may be coupled, but not necessarily integrated (e.g., different peripheral devices may not be integrated to a command device, but still may be "coupled"). Another example may be that any of the transceivers or antennas described herein that may be "coupled" to a processor, but not necessarily part of the package that includes a video device. Other examples may be inferred from the context disclosed herein, including this paragraph, when using the term "integrated".

As used herein "a wireless" connection between devices may be based on various wireless technologies, such as Bluetooth, Wireless-Fidelity (Wi-Fi) or variants of Wi-Fi (e.g. Wi-Fi Direct. Devices may be "wirelessly connected" based on different cellular communication systems, such as, a Long-Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1X, Evolution-Data Optimized (EVDO), Time Division Synchronous CDMA (TD-SCDMA), or some other version of CDMA. In addition, when two devices are within line of sight, a "wireless connection" may also be based on other wireless technologies, such as ultrasound, infrared, pulse radio frequency electromagnetic energy, structured light, or directional of arrival techniques used in signal processing (e.g. audio signal processing or radio frequency processing).

As used herein A "and/or" B may mean that either "A and B," or "A or B," or both "A and B" and "A or B" are applicable or acceptable.

As used herein, a unit can include, for example, a special purpose hardwired circuitry, software and/or firmware in conjunction with programmable circuitry, or a combination thereof.

The term "computing device" is used generically herein to refer to any one or all of servers, personal computers, laptop computers, tablet computers, mobile devices, cellular telephones, smartbooks, ultrabooks, palm-top computers, personal data assistants (PDA's), wireless electronic mail receivers, multimedia Internet-enabled cellular telephones, Global Positioning System (GPS) receivers, wireless gaming controllers, and similar electronic devices which include a programmable processor and circuitry for wirelessly sending and/or receiving information.

Various examples have been described. These and other examples are within the scope of the following claims.

What is claimed is:

1. A device for video decoding an encoded current block of video data, the device comprising:
   a memory configured to store a reconstructed current block of video data; and
   one or more processors configured to:
      process one or more bits, in a bitstream, that represent a flag, and indicate the encoded current block of video data was encoded based on a unified candidate list;
      construct the unified candidate list for the current block, including:
         determine one or more adjacent neighboring blocks to the current block that are predicted using one or more translational motion vectors and add the one or more adjacent neighboring blocks as normal merge candidates to the unified candidate list; and
         determine one or more adjacent neighboring blocks to the current block that are predicted using one or more affine motion vectors and adding the one or more adjacent neighboring blocks as affine merge candidates to the unified candidate list such that all of the affine merge candidates follow all of the normal merge candidates of adjacent neighboring blocks in the unified candidate list;
      process a merge index in the bitstream, wherein the merge index indicates a candidate in the unified candidate list to be used to form a predictor block for the current block, the candidate being one of the normal merge candidates or the affine merge candidates;
      select one or more motion vectors of the candidate from the unified candidate list, the candidate corresponding to merge index;
      form, based on the selected one or more motion vectors from the candidate, the predictor block for the current block; and
      reconstruct the current block of video data based on the predictor block of video data.

2. The device of claim 1, wherein the unified candidate list includes at most seven normal merge candidates and at most four affine merge candidates.

3. The device of claim 1, wherein to form the predictor block for the current block, the one or more processors are configured to:
   when the candidate is one of the normal merge candidates, perform temporal motion compensation using the translational motion vectors of the candidate to form the predictor block; or
   when the candidate is one of the affine merge candidates, perform affine motion compensation using the affine motion vectors of the candidate to form the predictor block.

4. The device of claim 3, wherein when the candidate is one of the affine merge candidates, the selected one or more motion vectors of the affine merge candidate corresponds to a four-parameter affine model or a six-parameter affine model.

5. A method for video decoding an encoded current block of video data, comprising:
   processing one or more bits, in a bitstream, that represent a flag, and indicate the encoded current block of video data was encoded based on a unified candidate list;
   constructing the unified candidate list for the current block, including:
      determining one or more adjacent neighboring blocks to the current block that are predicted using one or more translational motion vectors and adding the one or more adjacent neighboring blocks as normal merge candidates to the unified candidate list and
      determining one or more adjacent neighboring blocks to the current block that are predicted using one or more affine motion vectors and adding the one or more adjacent neighboring blocks as affine merge candidates to the unified candidate list such that all of the affine merge candidates follow all of the normal merge candidates of adjacent neighboring blocks in the unified candidate list;
   processing a merge index in the bitstream, wherein the merge index indicates a candidate in the unified candidate list to be used to form a predictor block for the current block, the candidate being one of the normal merge candidates or the affine merge candidates;
   selecting one or more motion vectors of the candidate from the unified candidate list, the candidate corresponding to the merge index;
   forming, based on the selected one or more motion vectors from the candidate, the predictor block for the current block; and
   reconstructing the current block of video data based on the predictor block of video data.

6. The method of claim 5, wherein the unified candidate list includes at most seven normal merge candidates and at most four affine merge candidates.

7. An apparatus for video decoding an encoded current block of video data, comprising:
   means for processing one or more bits, in a bitstream, that represent a flag, and indicate the encoded current block of video data was encoded based on a unified candidate list;
   means for constructing the unified candidate list for the current block, including:
      means for determining one or more adjacent neighboring blocks to the current block that are predicted using one or more translational motion vectors and adding the one or more adjacent neighboring blocks as normal merge candidates to the unified candidate list; and
      means for determining one or more adjacent neighboring blocks to the current block that are predicted using one or more affine motion vectors and adding the one or more adjacent neighboring blocks as affine merge candidates to the unified candidate list such that all of the affine merge candidates follow all of the normal merge candidates of adjacent neighboring blocks in the unified candidate list;
   means for processing a merge index in the bitstream, wherein the merge index indicates a candidate in the unified candidate list to be used to form a predictor block for the current block, the candidate being one of the normal merge candidates or the affine merge candidates;
   means for selecting one or more motion vectors of the candidate from the unified candidate list, the candidate corresponding to the merge index
   means for forming, based on the selected one or more motion vectors from the candidate, the predictor block for the current block; and
   means for reconstructing the current block of video data based on the predictor block of video data.

8. A device for video encoding, the device comprising:
   one or more processors configured to:

construct a unified candidate list for a current block of video data, including:
- determine one or more adjacent neighboring blocks to the current block of video data that are predicted using one or more translational motion vectors and add the one or more adjacent neighboring blocks as normal merge candidates to the unified candidate list;
- determine one or more adjacent neighboring blocks to the current block that are predicted using one or more affine motion vectors and add the one or more adjacent neighboring blocks as affine merge candidates to the unified candidate list;
- determine to form a predictor block for the current block using the motion vectors of one of the candidates in the unified candidate list
- select a merge index corresponding to the one of the candidates in the unified candidate list; and
- provide the merge index in a bitstream; and a memory configured to store the video data.

9. The device of claim 1, wherein the one or more processors are further configured to, when the candidate comprises one of the affine merge candidates:
- determine a first size of the affine merge candidate;
- determine a second size of the current block; and
- modify the affine motion vectors of the affine merge candidate according to the first size and the second size.

10. The device of claim 1, wherein the one or more processors are further configured to:
- determine one or more non-adjacent neighboring blocks to the current block; and
- add the non-adjacent neighboring blocks as non-adjacent candidates to the unified candidate list following the affine merge candidates.

11. The method of claim 5, further comprising, when the candidate comprises one of the affine merge candidates:
- determining a first size of the affine merge candidate;
- determining a second size of the current block; and
- modifying the affine motion vectors of the affine merge candidate according to the first size and the second size.

12. The method of claim 5, further comprising:
- determining one or more non-adjacent neighboring blocks to the current block; and
- adding the non-adjacent neighboring blocks as non-adjacent candidates to the unified candidate list following the affine merge candidates.

13. The device of claim 7, further comprising:
- means for determining a first size of the affine merge candidate when the candidate comprises one of the affine merge candidates;
- means for determining a second size of the current block when the candidate comprises one of the affine merge candidates; and
- means for modifying the affine motion vectors of the affine merge candidate according to the first size and the second size when the candidate comprises one of the affine merge candidates.

14. The device of claim 7, further comprising:
- means for determining one or more non-adjacent neighboring blocks to the current block; and
- means for adding the non-adjacent neighboring blocks as non-adjacent candidates to the unified candidate list following the affine merge candidates.

15. The device of claim 8, wherein the one or more processors are further configured to, when the candidate comprises one of the affine merge candidates:
- determine a first size of the affine merge candidate;
- determine a second size of the current block; and
- modify the affine motion vectors of the affine merge candidate according to the first size and the second size.

16. The device of claim 8, wherein the one or more processors are further configured to:
- determine one or more non-adjacent neighboring blocks to the current block; and
- add the non-adjacent neighboring blocks as non-adjacent candidates to the unified candidate list following the affine merge candidates.

\* \* \* \* \*